(12) United States Patent
Lenz et al.

(10) Patent No.: US 10,347,400 B2
(45) Date of Patent: Jul. 9, 2019

(54) CABLE CLAMPING DEVICE FOR WIDENING OF BRAIDED SHIELDS OF CABLES

(71) Applicant: Komax SLE GmbH & Co. KG, Grafenau (DE)

(72) Inventors: Andreas Lenz, Grafenau (DE); Christian Boxleitner, Grafenau (DE)

(73) Assignee: KOMAX SLE GMBH & CO., KG, Grafenau (DE)

( * ) Notice: Subject to any disclaimer, the term of this patent is extended or adjusted under 35 U.S.C. 154(b) by 298 days.

(21) Appl. No.: 15/223,275

(22) Filed: Jul. 29, 2016

(65) Prior Publication Data

US 2017/0032872 A1    Feb. 2, 2017

(30) Foreign Application Priority Data

Jul. 31, 2015   (DE) .................. 10 2015 009 989

(51) Int. Cl.
| H01B 13/016 | (2006.01) |
| H01R 43/058 | (2006.01) |
| H02G 1/12 | (2006.01) |
| H01B 13/00 | (2006.01) |
| H01R 43/048 | (2006.01) |
| H01R 43/28 | (2006.01) |

(52) U.S. Cl.
CPC ..... H01B 13/0167 (2013.01); H01B 13/0036 (2013.01); H01R 43/048 (2013.01); H01R 43/058 (2013.01); H01R 43/0585 (2013.01); H02G 1/12 (2013.01); H02G 1/1256 (2013.01); H02G 1/1285 (2013.01); H01R 43/28 (2013.01)

(58) Field of Classification Search
CPC ............ H01B 13/0165; H01B 13/0167; H01R 43/0585; H01R 43/058; H02G 1/1256; H02G 1/1285
See application file for complete search history.

(56) References Cited

U.S. PATENT DOCUMENTS

| 2,182,663 A | * | 12/1939 | Eby ....................... B21D 13/04 100/232 |
| 3,828,305 A | | 8/1974 | Hogendobler |
| 4,719,697 A | | 1/1988 | Schwartzman et al. |
(Continued)

FOREIGN PATENT DOCUMENTS

| CN | 103378533 A | 10/2013 |
| DE | 102013206804 A1 | 10/2013 |
(Continued)

OTHER PUBLICATIONS

Office Action from the Chinese Patent Office dated Jan. 19, 2018 in related Chinese application No. 201610626307.1, and machine translation thereof.
(Continued)

*Primary Examiner* — Peter Dungba Vo
*Assistant Examiner* — Jeffrey T Carley
(74) *Attorney, Agent, or Firm* — J-TEK Law PLLC; Jeffrey D. Tekanic; Scott T. Wakeman

(57) ABSTRACT

A cable clamping device for widening a braided shield of a cable includes at least three clamping bodies that are arranged to form an equilateral polygonal passage for clamping the cable therein. The clamping bodies are slidable against each other to change the opening size of the passage.

16 Claims, 28 Drawing Sheets

(56) References Cited

U.S. PATENT DOCUMENTS

| | | | | |
|---|---|---|---|---|
| 4,873,901 | A | * | 10/1989 | Stoehr .................... H01R 43/05 81/9.51 |
| 5,010,797 | A | * | 4/1991 | Stepan .................... G02B 6/245 81/9.51 |
| 5,146,673 | A | * | 9/1992 | Hoffa .................... H02G 1/1256 29/33 M |
| 5,402,693 | A | * | 4/1995 | Hoffa .................... H02G 1/1256 81/9.51 |
| 6,107,572 | A | | 8/2000 | Miyazaki |
| 6,363,604 | B1 | * | 4/2002 | Sakuma ............... H02G 1/1256 29/564.4 |
| 6,536,103 | B1 | | 3/2003 | Holland et al. |
| 6,604,268 | B1 | | 8/2003 | Fujita et al. |
| 6,659,140 | B2 | | 12/2003 | Yamakawa |
| 6,776,196 | B2 | | 8/2004 | Yamakawa |
| 8,468,688 | B2 | | 6/2013 | Montena et al. |
| 8,752,282 | B2 | | 6/2014 | Wilson et al. |
| 8,875,599 | B2 | * | 11/2014 | Shimizu ............... H02G 1/1256 81/9.4 |
| 2004/0031144 | A1 | | 2/2004 | Holland |
| 2004/0083607 | A1 | | 5/2004 | Campbell |
| 2005/0181672 | A1 | | 8/2005 | Matsuoka |
| 2008/0313892 | A1 | | 12/2008 | Baldauf |
| 2013/0283605 | A1 | * | 10/2013 | Furuhata ............ H01B 13/0167 29/828 |
| 2016/0203889 | A1 | | 7/2016 | Furuhata et al. |

FOREIGN PATENT DOCUMENTS

| | | |
|---|---|---|
| DE | 102013021690 A1 | 6/2015 |
| EP | 0297484 A1 | 1/1989 |
| EP | 2887475 A1 | 6/2015 |
| EP | 2887475 B1 | 7/2016 |
| GB | 521433 A | 5/1940 |
| KR | 20090012235 U | 12/2009 |
| TW | 200717949 B | 3/2009 |
| WO | 2006128597 A1 | 12/2006 |

OTHER PUBLICATIONS

Search Report from the Chinese Patent Office dated Jan. 11, 2018 in related Chinese application No. 201610626307.1, and translation of substantive portions thereof.
Extended European Search Report from the European Patent Office dated Dec. 1, 2016 in related EP application No. 16 181 759.8, including European Search Report, European Search Opinion, and translation of substantive portions thereof.
Office Action dated Apr. 25, 2016 in the corresponding German priority application 10 2015 009 989.2, including English translations of substantive portion of the Office Action and the examined claims 1-10.
Office Action from the Chinese Patent Office dated Sep. 14, 2018 in counterpart Chinese application No. 201610626307.1.

* cited by examiner

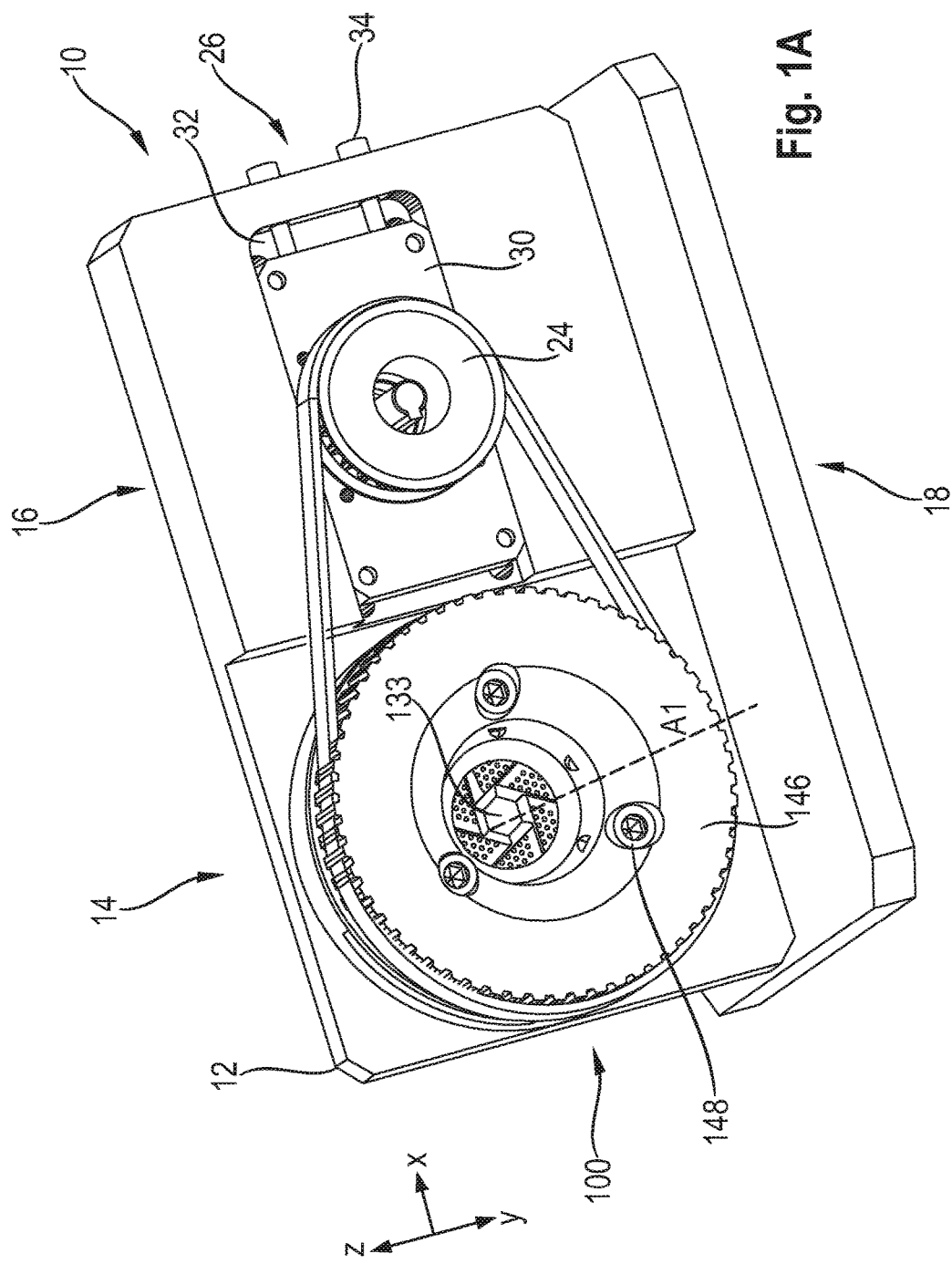

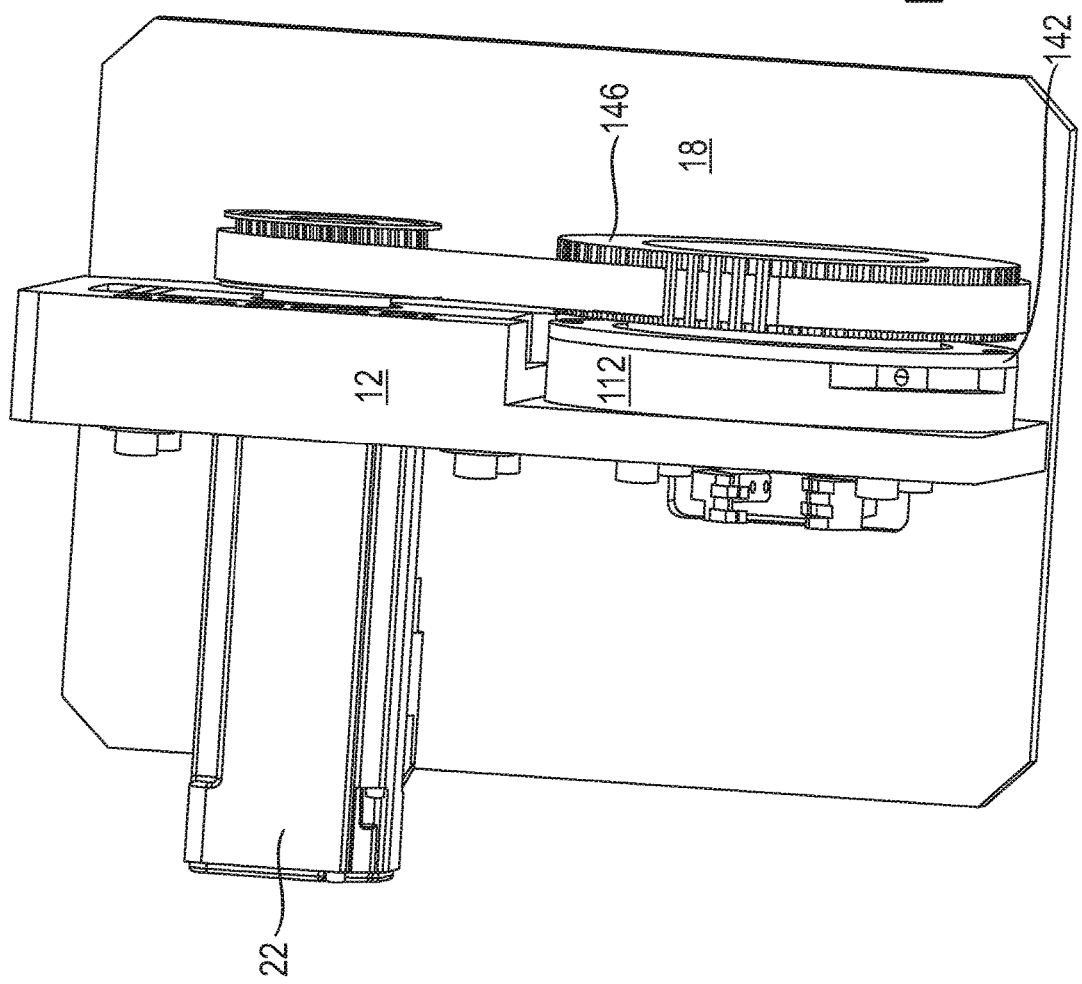

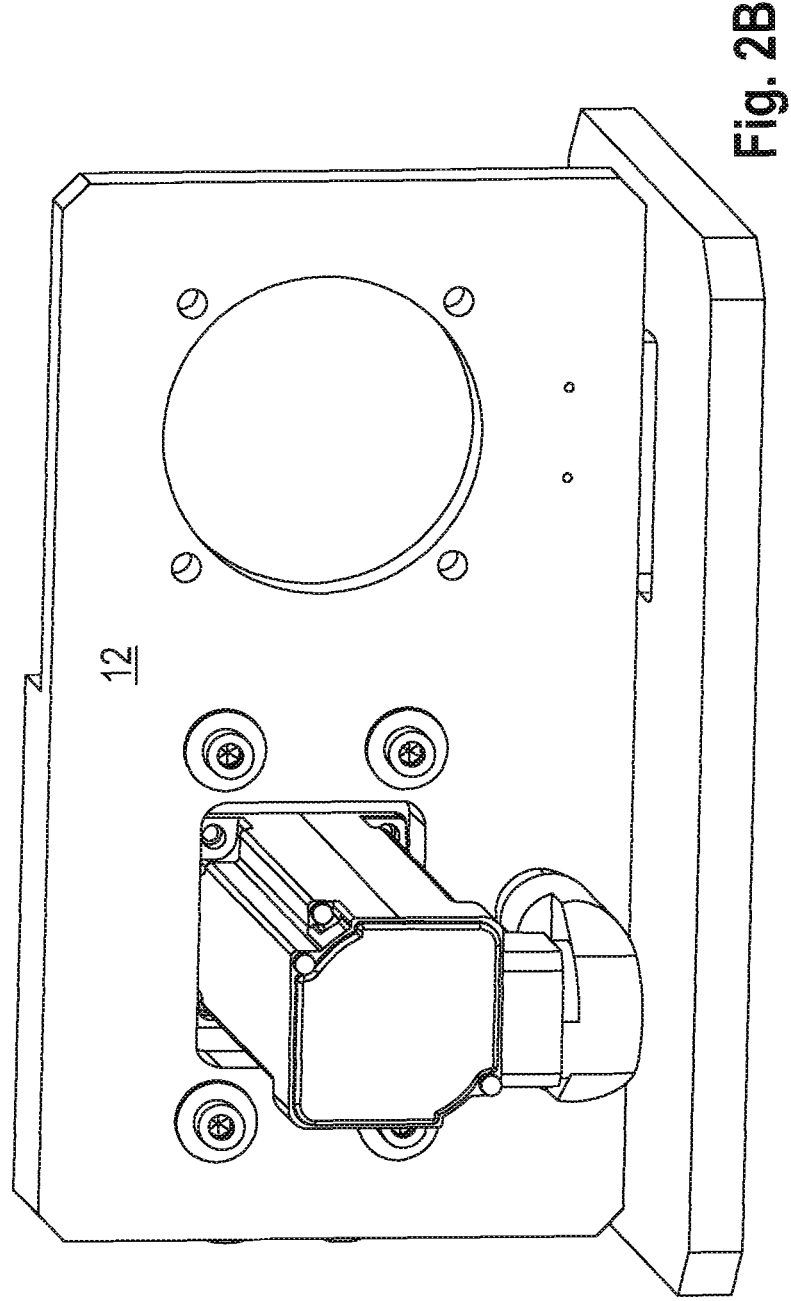

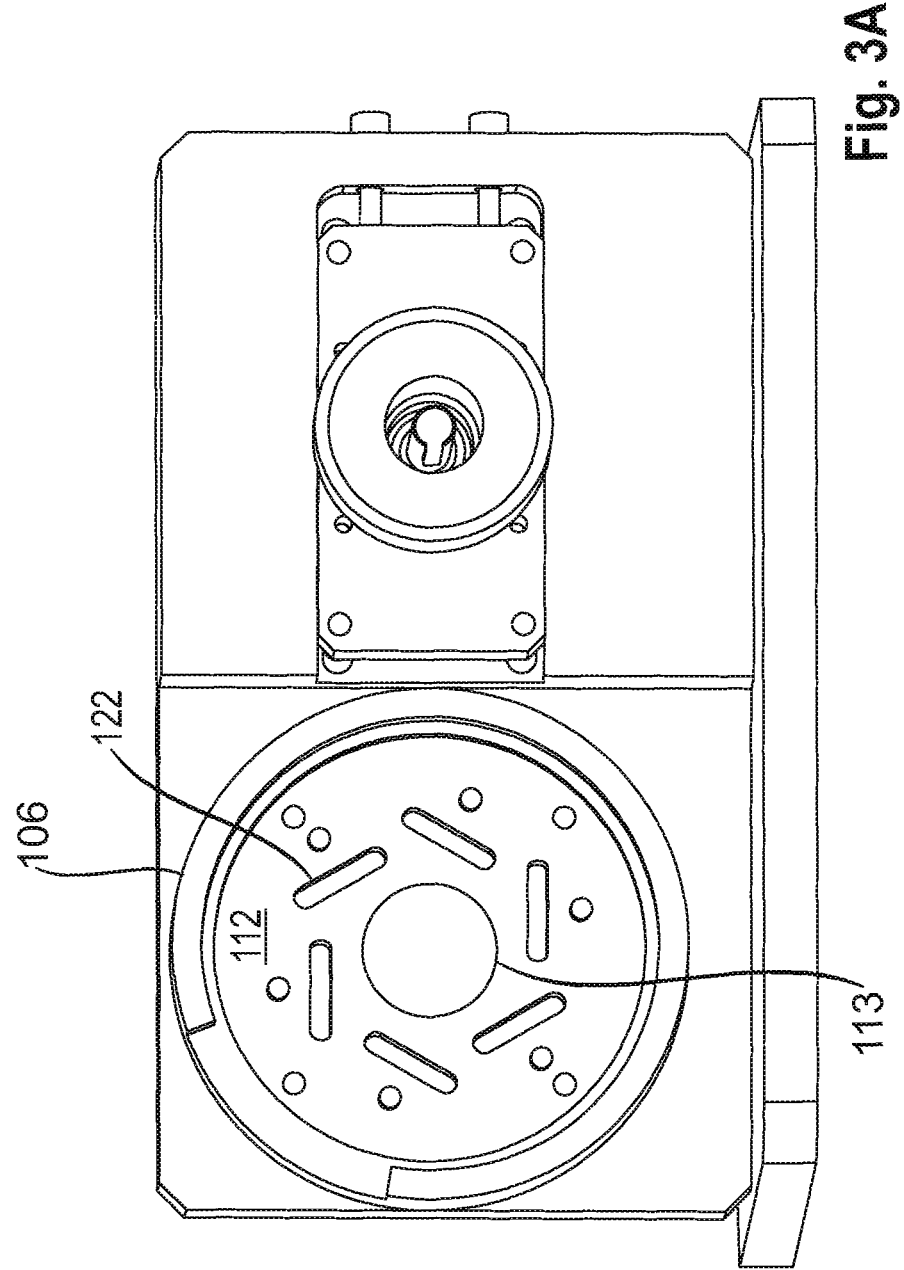

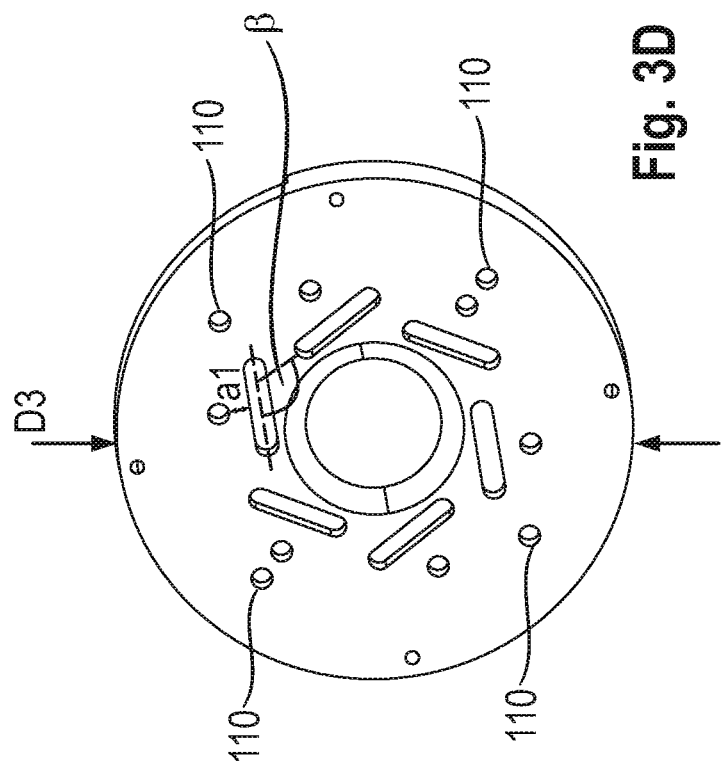

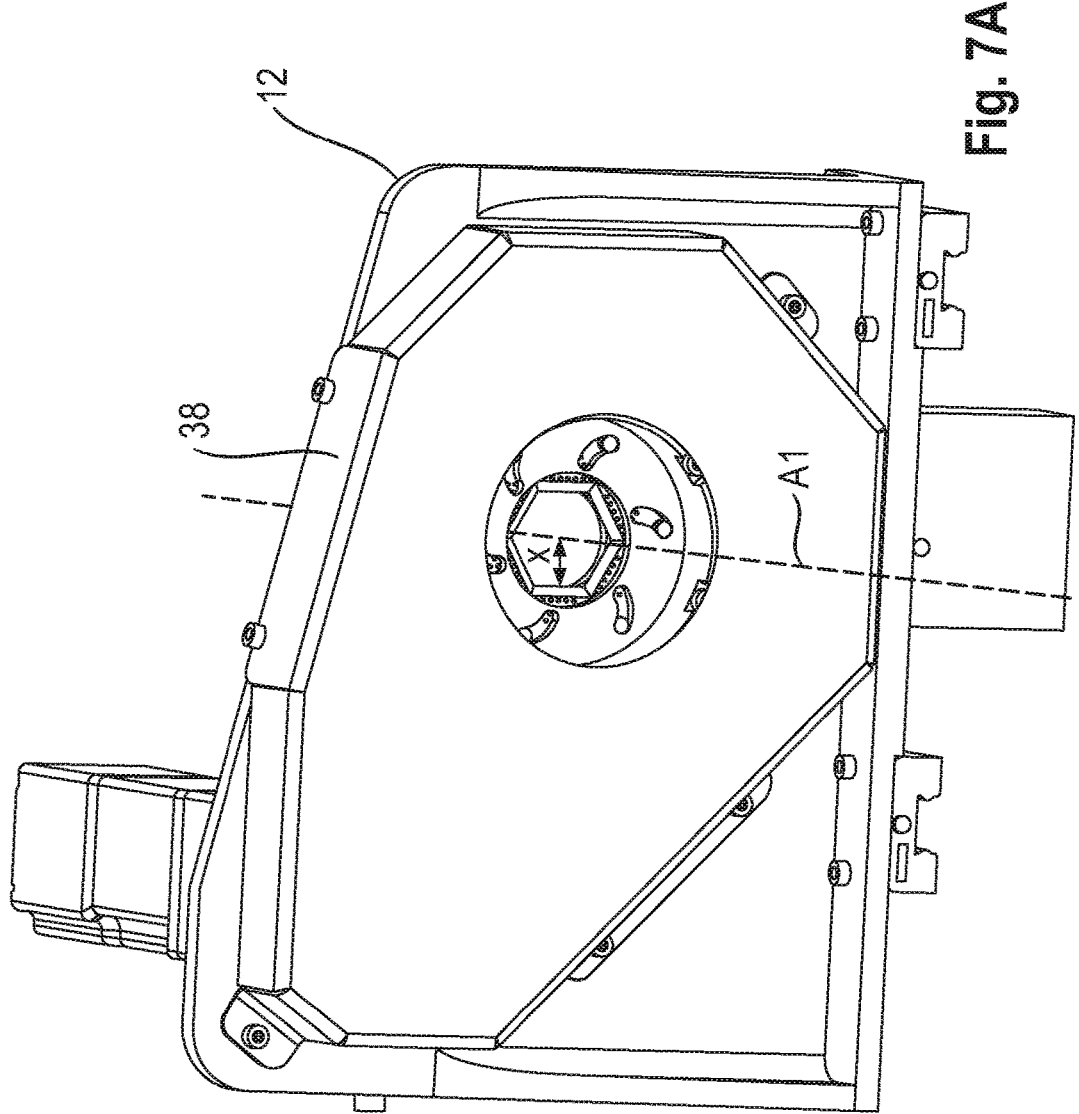

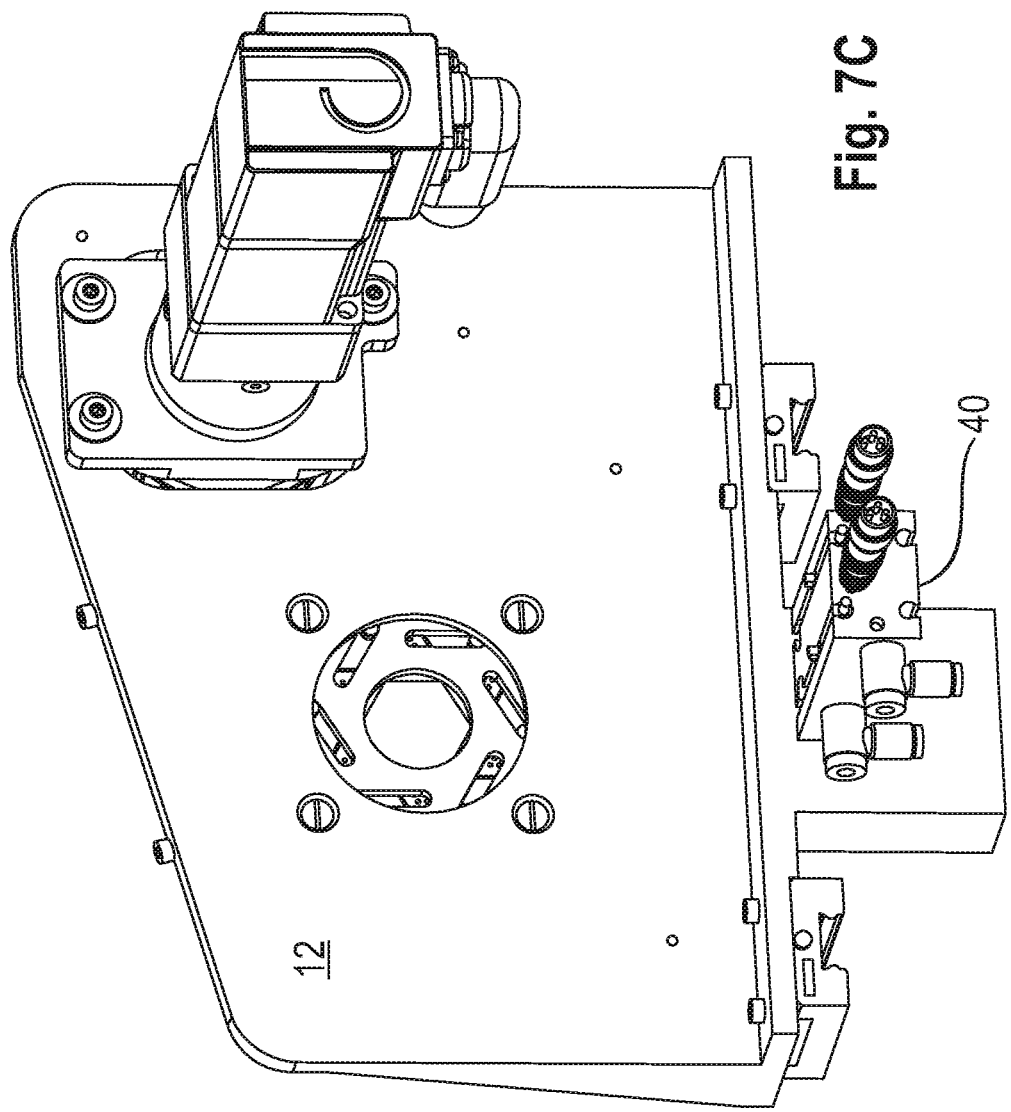

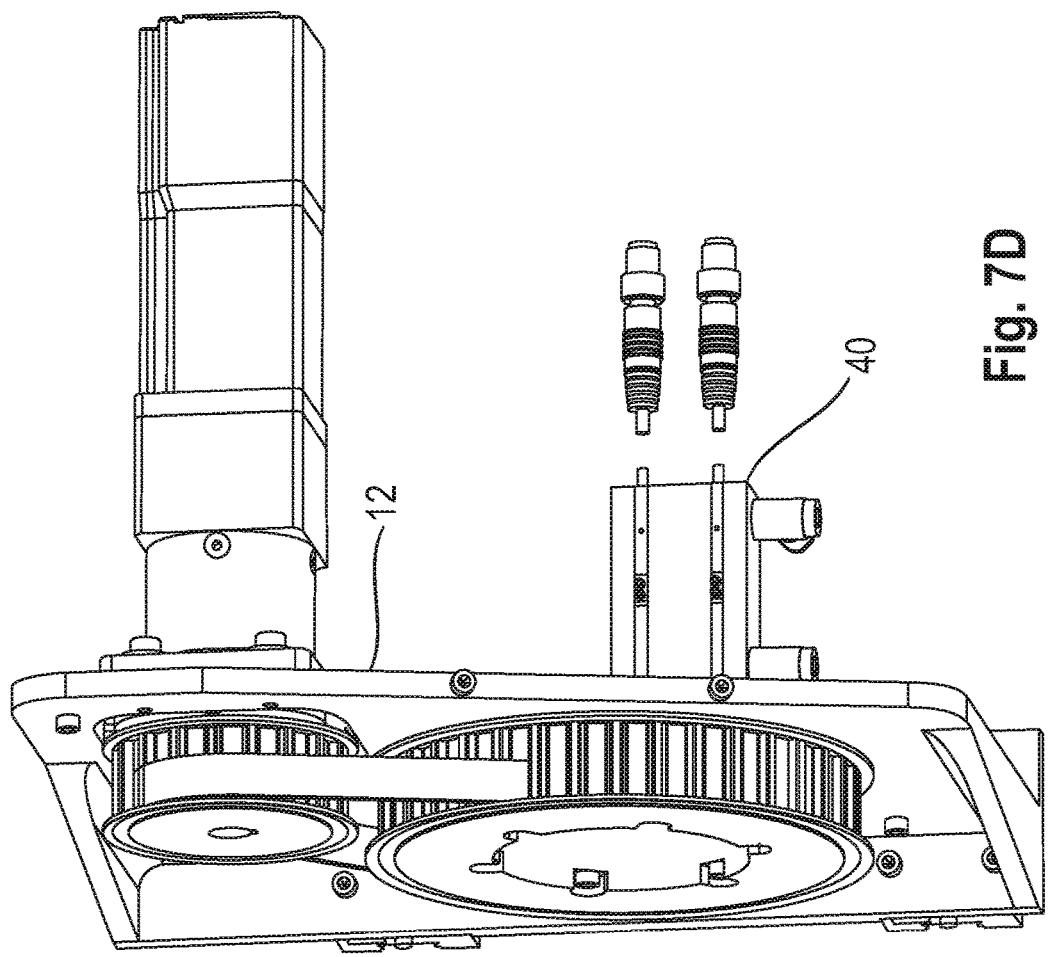

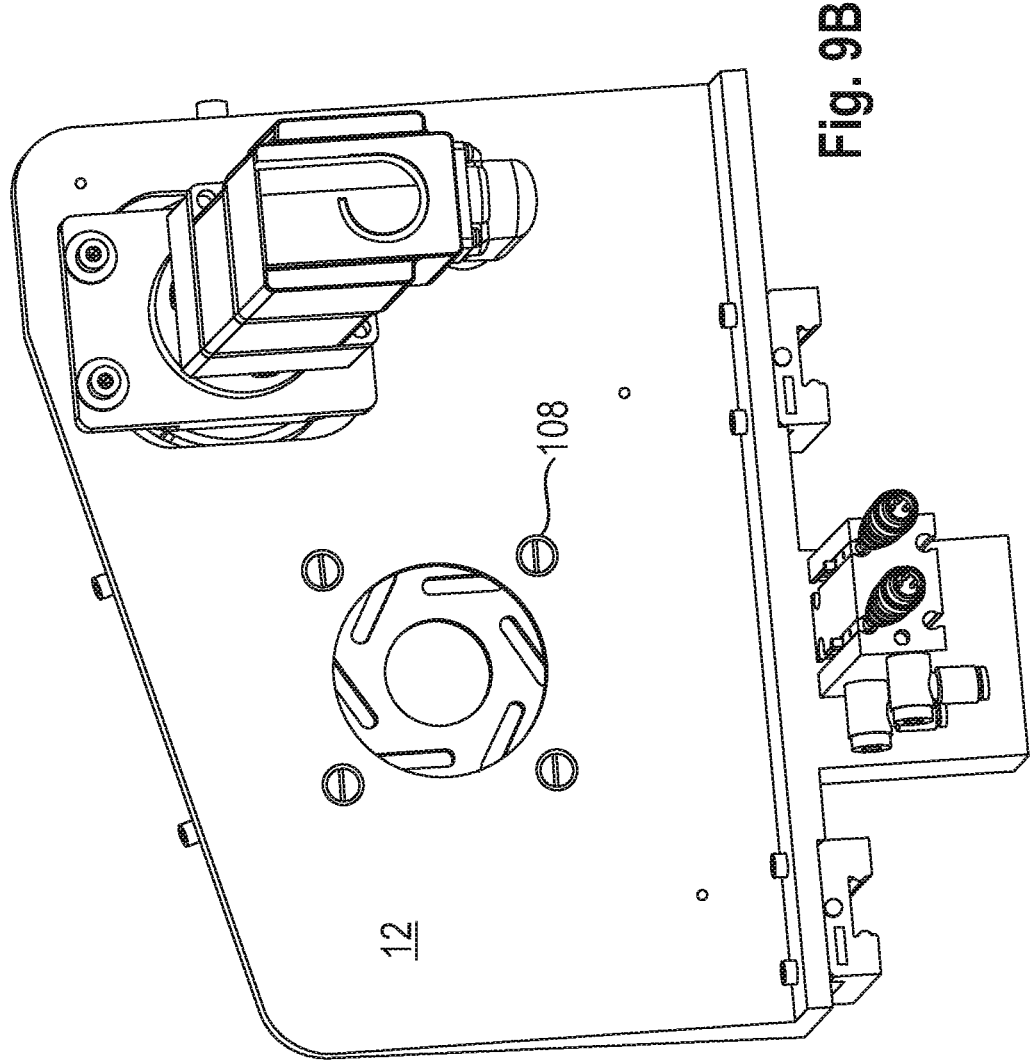

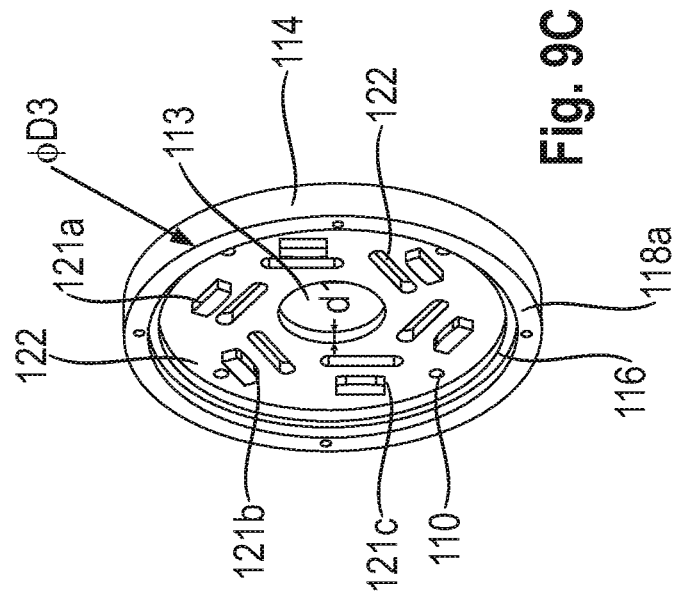

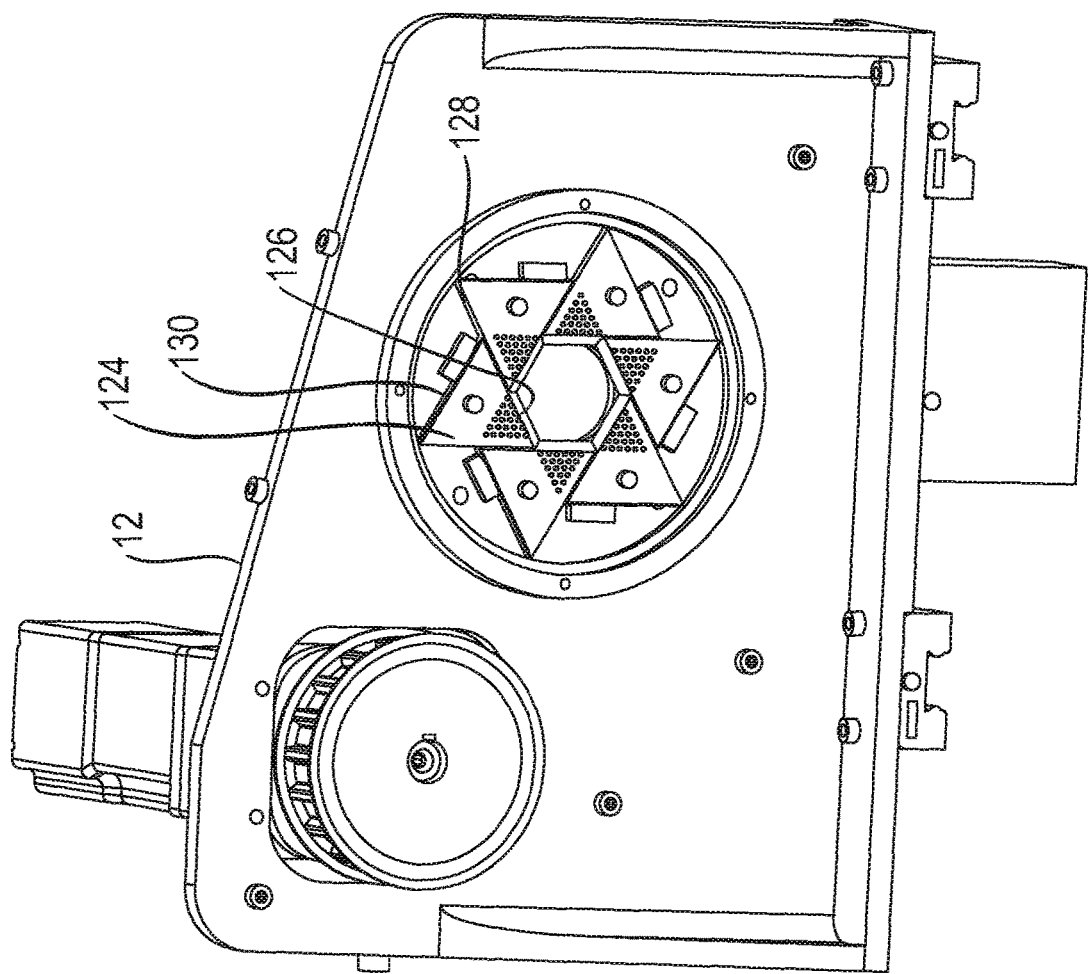

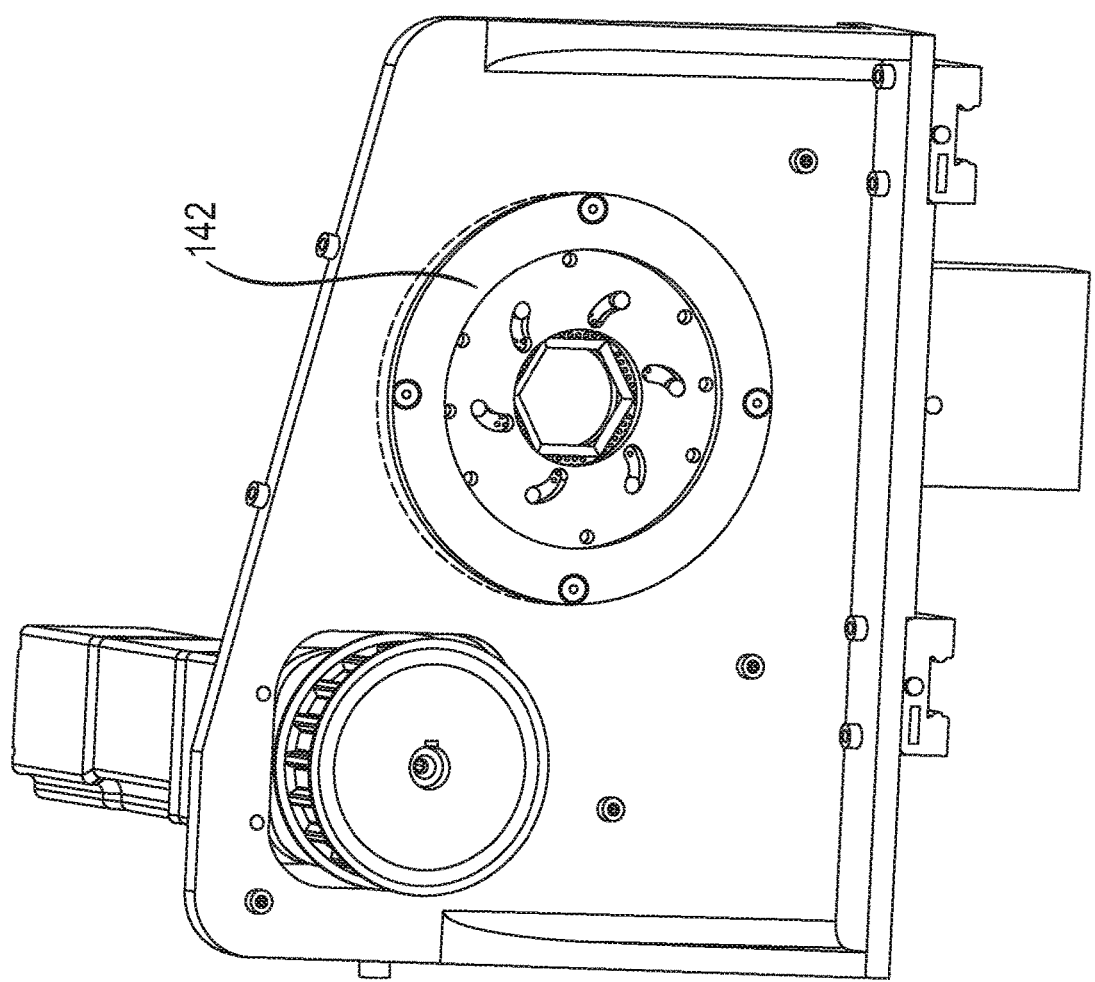

CABLE CLAMPING DEVICE FOR WIDENING OF BRAIDED SHIELDS OF CABLES

CROSS-REFERENCE TO RELATED APPLICATION

The present application claims priority to German patent application serial number 10 2015 009 989.2 filed on Jul. 31, 2015, the contents of which are incorporated fully herein by reference.

TECHNICAL FIELD

The present invention generally relates to a cable clamping device for widening (flaring or opening) of braided shields (shielding braids) of cables, such as coaxial cables.

BACKGROUND ART

Known cables have a tubular conductive shielding that surrounds one or more inner conductors (wires) and prevents leakage of electrical and magnetic fields outside of the shield. The tubular shielding is typically provided by a braided (woven) mesh formed, for example, from electrically conductive (e.g., metal) wire. A coaxial cable is an example of such a cable having a braided shield and includes an inner conductor (central core) surrounded by insulation material (inner dielectric insulator). Coaxial therewith, the insulation material of the inner conductor is surrounded by an outer conductor in the form of a woven braid (braided shield). In turn the braided shield is also surrounded (covered) by another layer of insulation material (outer insulation or outer plastic sheath).

To install an electrical connector (e.g., an F-type or N-type coaxial connector) on the end of the coaxial cable, it is necessary, among other things, to remove the outer insulation surrounding the braided shield and then push back the end of the braided shield, which overlays the inner insulation, by a predetermined length while widening (flaring) it essentially perpendicular to the direction of extension of the inner conductor. Up to now, the widening or flaring of the braided shield has been achieved, for example, by using compressed-air jets inserted between the inner insulation and the braided shield.

Another method for widening and preparing the braided shield was disclosed in WO 2006/128597 A1 and its English counterpart US 2008/0313892, wherein the braided shield is exposed at the end of the cable, flared radially, and bent back away from the end of the coaxial cable over a predetermined length in the axial direction. During this process, the braided shield is subjected to a radially inwardly directed force over at least a part of the circumference of the coaxial cable to flare the braided shield.

Further examples of cables having braided shields are multi-wire cables (also known as "multicore cables") that are surrounded by a common shield, such as, for example, high speed data (HSD) cables used in the automotive industry.

Another device for widening a braided shield was disclosed in DE 10 2013 206 804 A1 and its English counterpart US 2013/0283605, wherein the widening is effected by two mutually engaging shaping blocks that each have a trapezoidal groove.

SUMMARY OF THE INVENTION

In one aspect of the present teachings, an improved cable clamping device (or cable shield processing machine) for widening (flaring or opening) of braided shields is disclosed, which is capable of uniformly widening the outer conductor (braided shield) over the entire circumference of the cable, while also reducing or preventing damage to the braided shield during the widening.

In another aspect of the present teachings, a cable clamping device may preferably include at least three clamping bodies that are arranged to define an equilateral polygon-shaped (but nearly circular-shaped) passage for clamping the cable. The size, width and/or circumference of the passage is variable, while maintaining the same equilateral polygonal shape, by moving the clamping bodies relative to each other in a radially and circumferentially synchronized manner.

Such a clamping device is capable of achieving a uniform and reliable widening (flaring or opening) of the braided shield (shielding braid). Since the size of the circumference and/or diameter of the essentially circular passage formed by the clamping bodies is readily changeable, a uniform widening can be achieved irrespective of the cable diameter and the cable tolerance. In addition, the same device can be used for a variety of different cable cross-sections and cable types. Due to the uniform force distribution applied to the entire circumference of the cable and the essentially gap-free sliding of the individual clamping bodies against each other, damage to the braided shield can be reliably avoided.

Further objects, embodiments, features, advantages and utilities will be readily understood after reading the following description of exemplary embodiments and the claims with reference to the Figures.

BRIEF DESCRIPTION OF THE DRAWINGS

FIG. 1A shows a front view of a cable clamping device according to an exemplary first embodiment of the present teachings.

FIG. 1C shows a top view of the cable clamping device according to the first embodiment.

FIG. 2B shows a rear view of FIG. 2A.

FIG. 3A shows a front view of a further partially assembled cable clamping device according to the first embodiment.

FIG. 3D shows a rear view of FIG. 3C.

FIG. 7A shows a front view of a cable clamping device according to an exemplary second embodiment.

FIG. 7C shows a rear view of a further partially assembled cable clamping device according to the second embodiment.

FIG. 7D shows a top view of the cable clamping device according to the second embodiment.

FIG. 9B shows a rear view of FIG. 9A.

FIG. 9C shows a front view of a guide device of the cable clamping device according to the second embodiment.

FIG. 10A shows a front view of a further partially assembled cable clamping device according to the second embodiment.

FIG. 12 shows a front view of a further partially assembled cable clamping device according to the second embodiment.

DETAILED DESCRIPTION OF THE EMBODIMENTS

In the following, a first and a second embodiment of a cable clamping device (cable shield processing device) 10 will be described with reference to FIGS. 1 to 12. A fully assembled cable clamping device 10 according to the first embodiment is shown in FIGS. 1A to 1D. FIGS. 2 to 6 each show three-dimensional (3D) views (front- and rear-(side) views) of the cable clamping device in successive stages of an assembly process. All of the components and assemblies shown in the views according to FIGS. 2 to 6 are also present in the fully assembled cable clamping device 10 according to FIG. 1. The x-y-z coordinate system shown in FIG. 1 applies to all Figures (rotated accordingly).

Figure 2A:
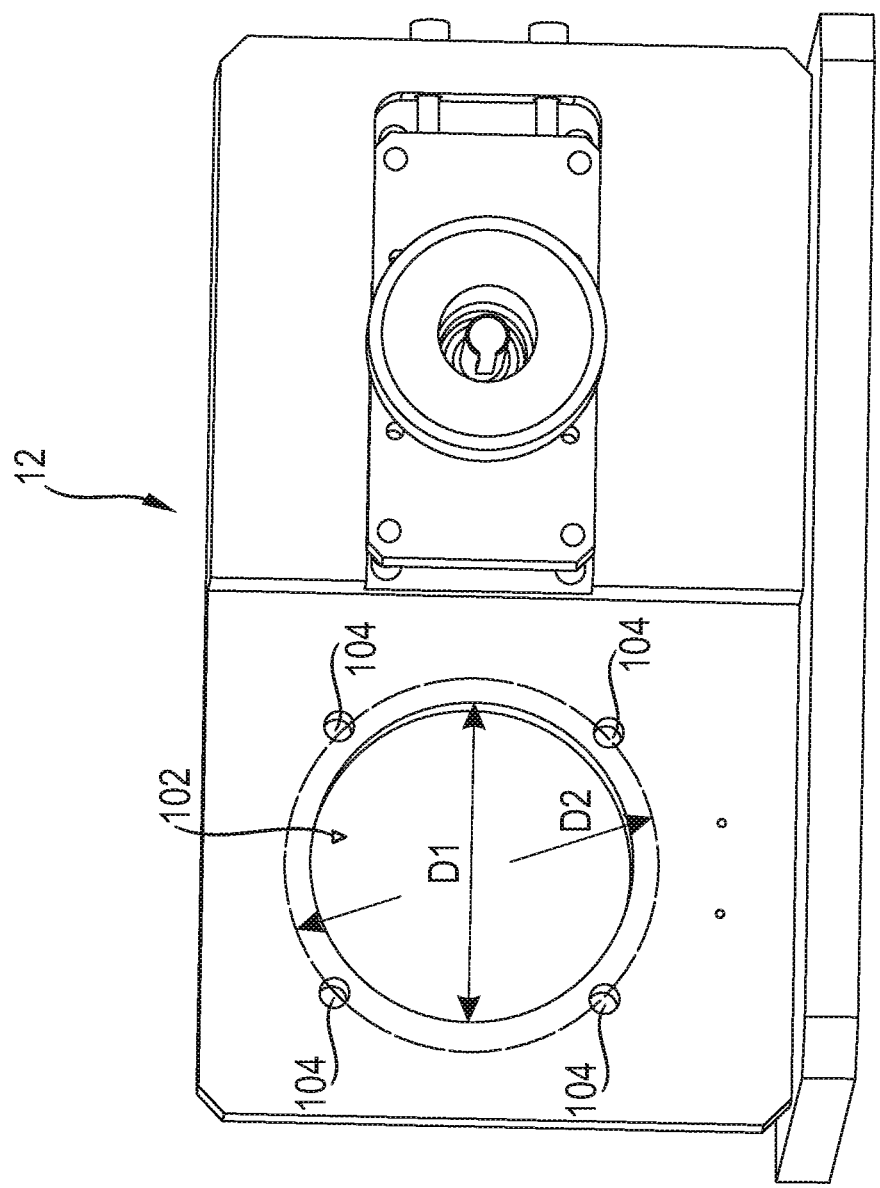
FIG. 2A shows a front view of a partially assembled cable clamping device according to the first embodiment.

As can be seen in FIGS. 2A and 2B, the cable clamping device includes a base plate (component mounting plate) 12 that has an essentially rectangular shape. The base plate 12 has a length in an X direction and a width in a Y direction perpendicular thereto. The base plate 12 has a thickness in a Z direction perpendicular to the X- and Y-direction. The base plate is divided in its longitudinal direction into a cable-clamping-mechanism region 14 and a drive-device region 16. One of the longitudinal edges of the base plate 12 is attached to a rectangular floor plate 18, which extends in an X-Z plane, or it is formed integrally with the floor plate 18.

Figure 1B:
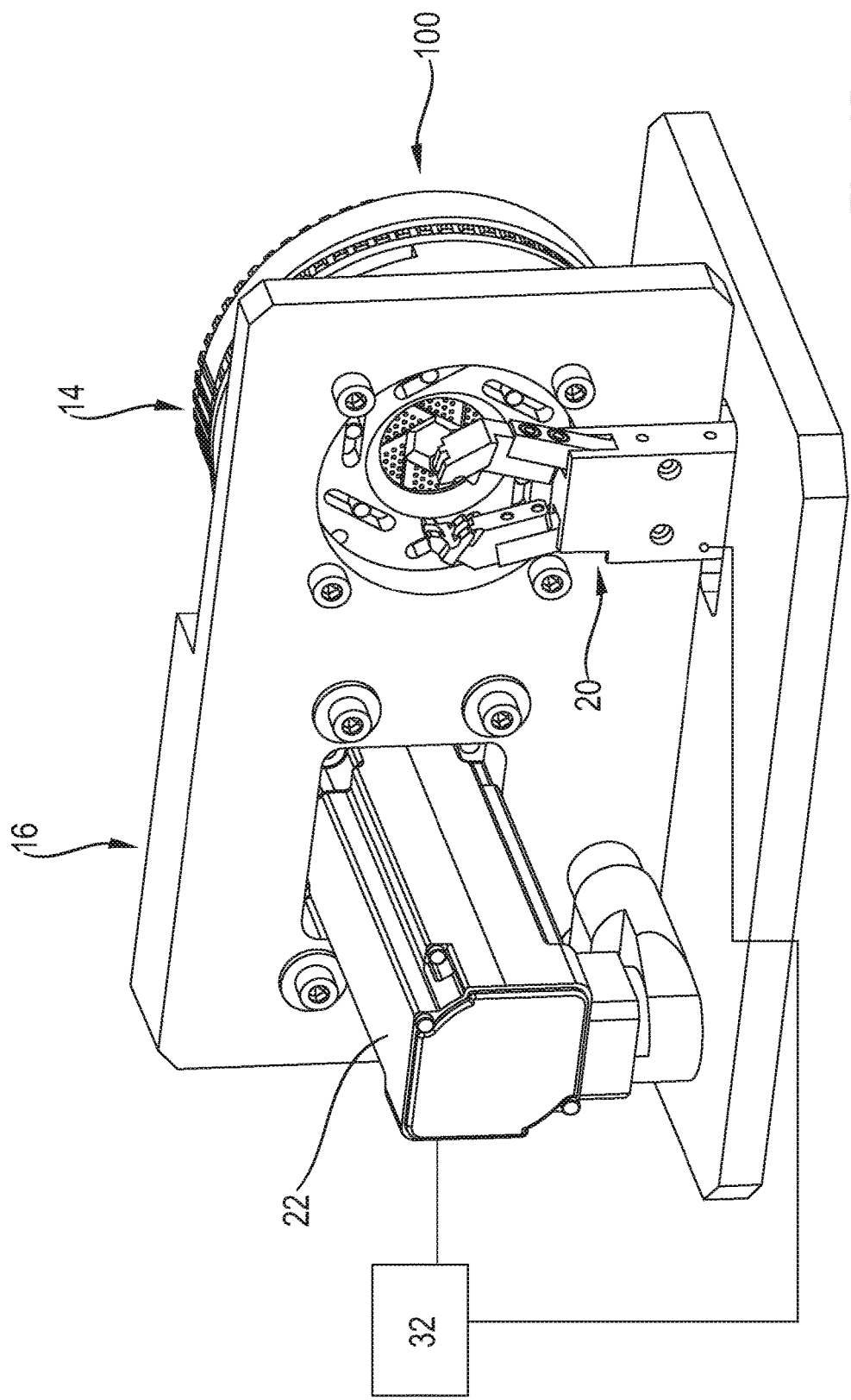
FIG. 1B shows a rear view of the cable clamping device according to the first embodiment.

In or on the cable-clamping-mechanism region 14, a cable clamping mechanism 100 is provided in or on the front side, which is depicted in FIG. 1A, of the base plate 12; the structure of the cable clamping mechanism 100 is described in more detail below. Furthermore, on the rear side of the floor plate 18, which is shown in FIG. 1B, in or on the cable-clamping mechanism region 14, a cable retaining device 20 for positioning and retaining a not-shown cable end in the cable clamping mechanism 100 is attached to the base plate 12 and/or to the floor plate 18, for example, by welding, or is formed integrally therewith.

A motor 22, extending through the drive-device region 16 of the base plate 12, for driving the cable clamping mechanism 100 is attached in or on the drive-device region 16.

The structure of the cable clamping mechanism 100 is described in detail below in particular with reference to FIGS. 2 to 6.

As can be seen from FIGS. 2A and 2B, the cable-clamping-mechanism region 14 of the base plate 12 includes a circular opening (through-opening) 102 having a diameter D1. An imaginary central axis A1 (shown in FIG. 1D) extending perpendicular to the base plate 12 in the Z direction extends through the circular opening 102. Four additional smaller through-bores 104 are formed radially outward of the circular opening 102 and are uniformly distributed in the circumferential direction along an imaginary circle having a second diameter D2.

Figure 3B:
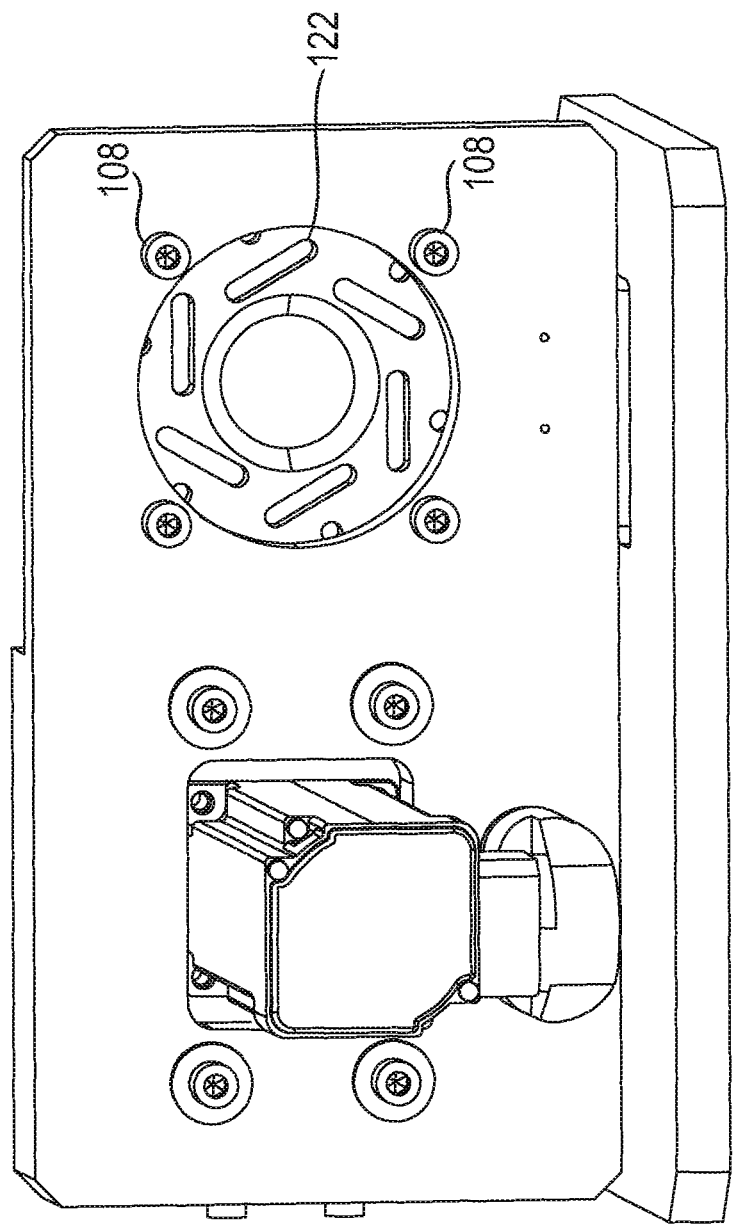
FIG. 3B shows a rear view of FIG. 3A.

As is shown in FIGS. 3A and 3B, a disc-shaped guiding device 106 is attached to the front side of the base plate 12 in a first assembly step.

Figure 3C:
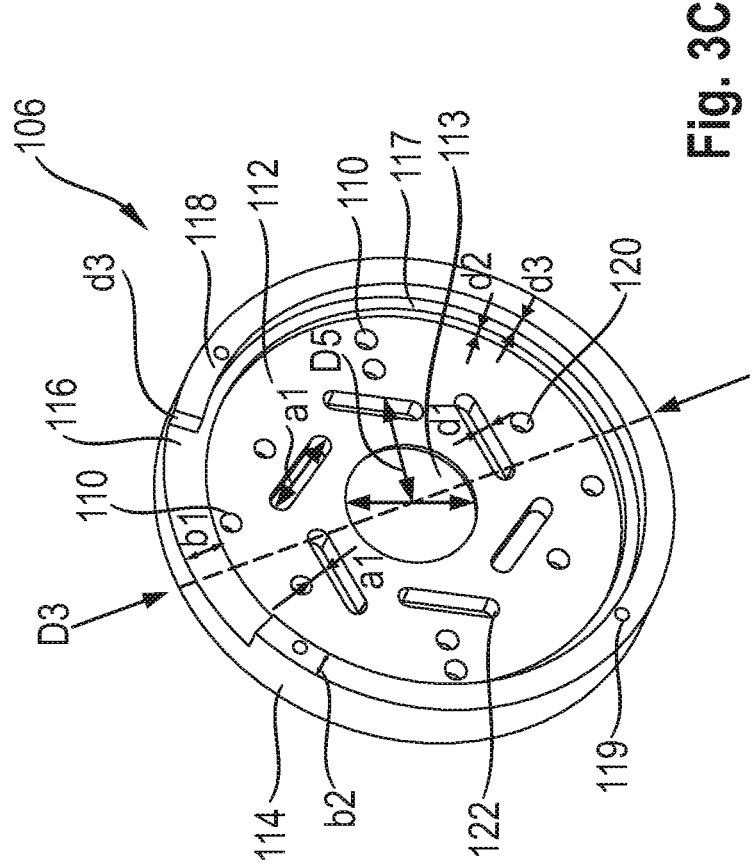
FIG. 3C shows a front view of a guide device of the cable clamping device according to the first embodiment.

FIGS. 3C and 3D respectively show the front-side and rear-side of the guide device 106 in the not-installed state. The guide device 106 is substantially formed from a disc-shaped base body 112 having an outer diameter D3, which is greater than the diameter D1, and a first thickness d1. A central through-hole 113 having a diameter D4, which is smaller than the diameter D1, is provided in the disc-shaped base body 112. In the installed state, a central axis through the through-hole 113 coincides with the central axis A1. Four first threaded bores 110 are uniformly distributed in the circumferential direction along an imaginary circle having the diameter D2. In the installed state, the threaded bores 110 are aligned with the through-bores 104.

Furthermore, six second fitting bores 120 are uniformly distributed in the circumferential direction and are provided radially inward of the first threaded bores 110 along an imaginary circle having a diameter D5. Furthermore, the disc-shaped base body 112 includes six straight guide slots 122 disposed radially inward of the second fitting bores 120 about the central axis A1. Each guide slot 122 has a first predetermined length c and extends in a predetermined direction. Imaginary extensions of adjacent guide slots intersect at an angle β of 120° to each other.

The center points of the guide slots 122 with regard to their respective longitudinal extensions fall along a common imaginary circle having the central axis A1 as its center. An imaginary plane, in which the imaginary central axis through the through-hole 113 and two center points in the longitudinal direction of the guide slots 122 lie, does not form a plane of symmetry for the respective guide slots 122. Instead, in this embodiment, opposing guide slots 122 are disposed parallel to each other and their longitudinal direction is inclined with respect to the imaginary plane. Each fitting bore 120 is disposed at a predetermined distance (a1) perpendicular to the longitudinal extension of the respective guide slot 122 centered to the guide slot 122 with respect to the ends of guide slot 122. Thus none of the guide slots 122 extend perpendicular to an imaginary radial line emanating from the central axis A1 through the center point of the respective guide slot 122.

In the region of the circumferential edge of the base body, a step-shaped, annular edge region 114 is formed on the front side of the base body 112, which front side is shown in FIG. 3C. The outer edge of the edge region 114 ends flush with the circumferential edge of the base body 112. The edge region 114 is preferably formed integral with the base body 112. As is shown in FIG. 3C, the edge region 114 is composed of a first ring region 116, which has a first radial width b1 in the radial direction and a second thickness d2, and it is attached on the front side of the base body 112 or is integrally formed therewith. A second ring region 118, which is not continuous in the circumferential direction, is formed on the first ring region 116 in the thickness direction. The second ring region 118 has a second width b2 in the radial direction and a third thickness d3. The second width b2 is smaller than the first width b1 so that an annular step 117 is formed on the front surface of the first ring region 116. Four threaded bores 119 are uniformly distributed in the circumferential direction and are formed on the front side of the second ring region 118. The ring regions 116, 118 can be formed integrally with the base body 112. The gap in the ring region 118 is optional.

The rear side of the disc-shaped base body 112, which is configured to abut on the base plate 12 in the assembled state, is flat. As shown in FIGS. 3A and 3B, the rear side of the disc-shaped base body 112, which is shown in FIG. 3D, is attached to the base plate 12 using screw-bolts 108 that extend through the through-bores 104 in the base plate 12 and engage in the corresponding threaded bores 110 of the guide device 106. The base body 112 or the guide device 106 is thus disposed with respect to the base plate 12 such that the central axis of the base body 112 is identical to (coincides with) the imaginary central axis A1 that extends orthogonally through the through-hole 102.

Figure 4A:
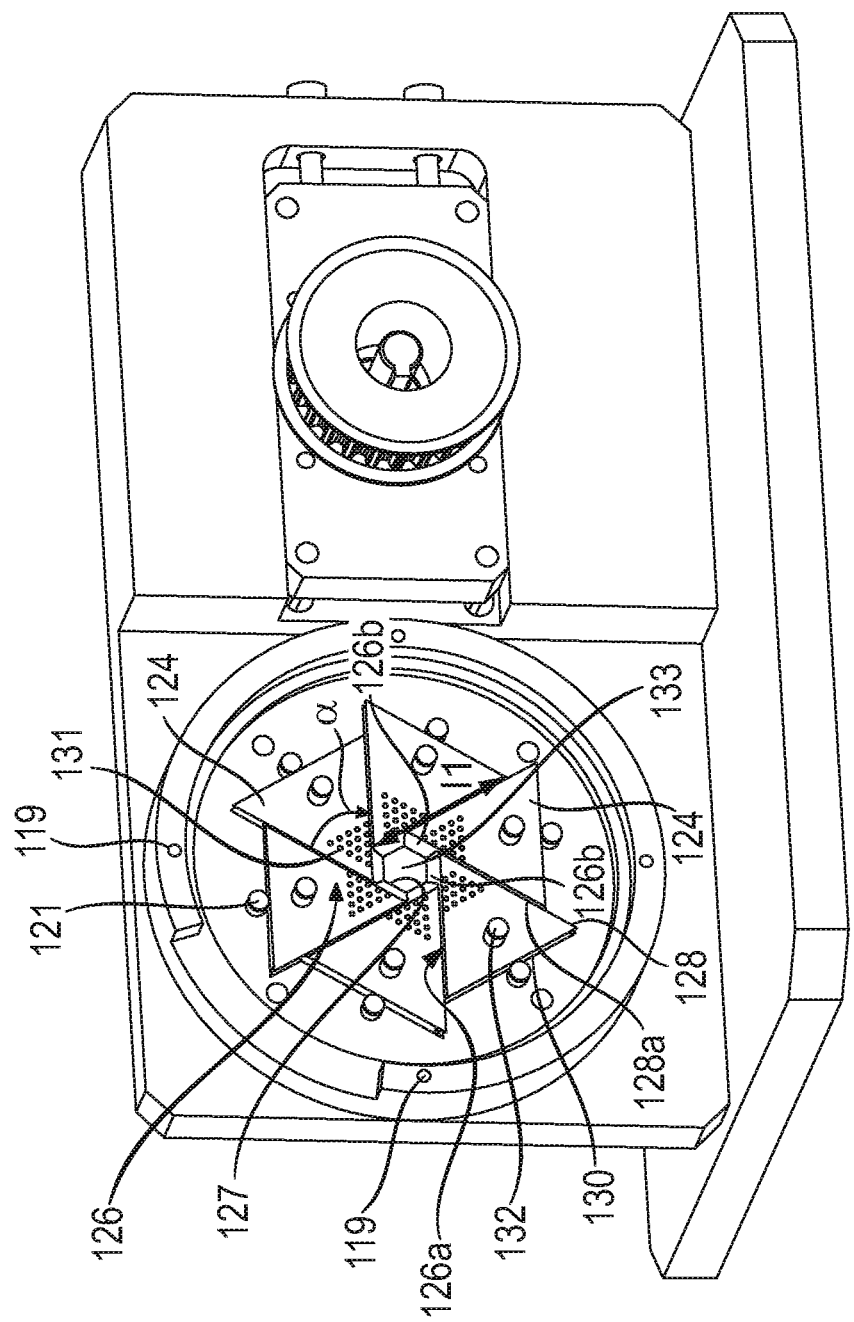
FIG. 4A shows a front view of a further partially assembled cable clamping device according to the first embodiment.
Figure 4B:
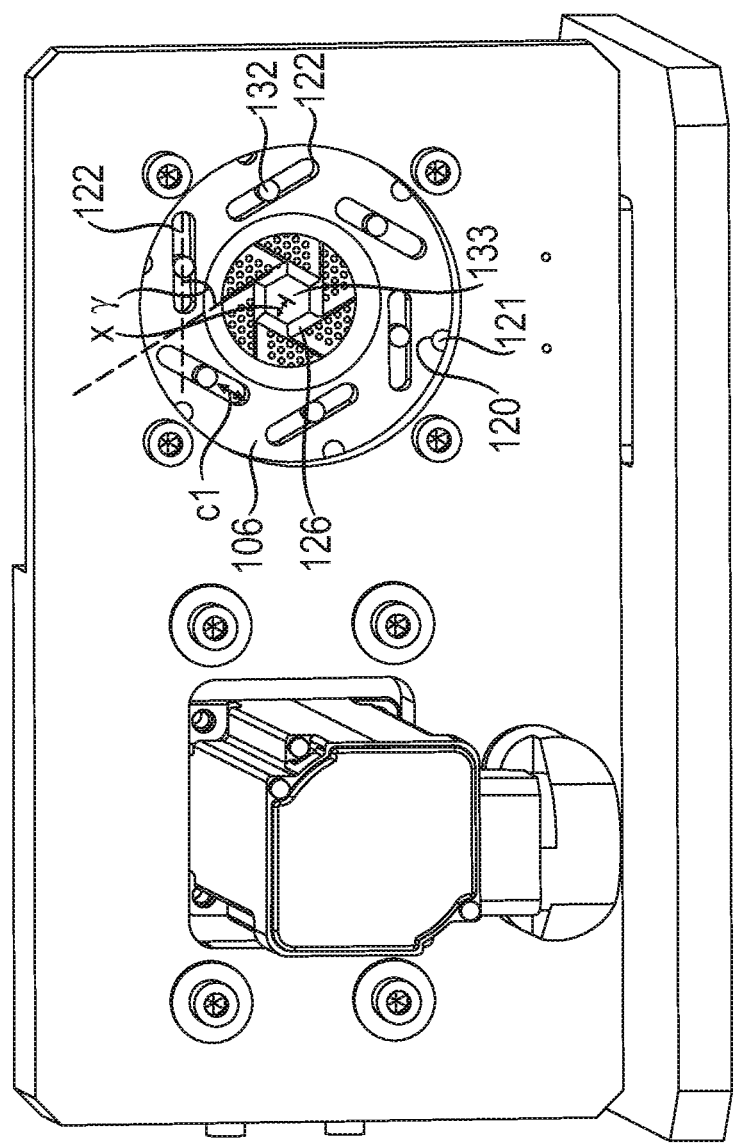
FIG. 4B shows a rear view of FIG. 4A.

In a next assembly step, which is shown in FIGS. 4A and 4B, guide bolts (fitted-bolts) 121 are inserted into the second fitting bores 120. The guide bolts 121 are configured such that, after the insertion into the fitting bores 120, they protrude from the disc-shaped base body 112 slightly less than the second thickness d2 of the first edge region 116.

In addition, the clamping bodies 124, whose edges are movable (slidable) relative to each other to contact and press the shield in order to widen (flare or open) the shield (shielding braid), are inserted into the cable clamping mechanism 100 in this assembly step.

In the present embodiment, each clamping body 124 is configured as an equilateral triangle, wherein one side (edge) or side surface (edge surface) of the equilateral triangle forms a clamping surface 126, a second side (edge) or side surface (edge surface) forms a sliding surface 128, and the third side (edge) or side surface (edge surface) forms a base surface 130. In the present embodiment, the clamping surface 126, the sliding surface 128, and the base surface 130 are provided in this order in the clockwise direction in a plan view of the front side. At least the sides of the clamping surface 126 and of the sliding surface 128 are flat and have a first length l1. The base surface 130 may also be flat and have the first length l1. Each clamping body 124 has a thickness d4 that is smaller than the second thickness d2 of the first edge region 116.

The clamping surface 126 preferably has an inverted V shape or peak shape. That is, the clamping surface 126 is preferably not flat and perpendicular to the front- or rear-surface or -side of the triangle; rather, two surfaces disposed at an acute angle to each other are provided that meet centrally in the thickness direction in (along) a clamping edge 127. The sliding surface 128 is preferably shaped as a V-shaped groove, into which the inverted V-shaped clamping surface 126 of another clamping body 124 can engage and slide in an essentially clearance-free manner. The base surface 130 is preferably a flat surface that extends perpendicular to the front- or rear-side of the clamping body 124.

Furthermore, each clamping body 124 includes guide bolts 132 disposed perpendicular to the base surface on its front- and rear-side centrally with respect to the longitudinal extension of the base surface 130 and at the distance a1 (or slightly smaller than a1) to each other. The guide bolts 132 can also be formed integrally by a single guide bolt 132 that extends through the clamping body 124 and is attached thereto, for example, by welding. As can be seen from FIGS. 4A and 4B, the guide bolt 132 protrudes, both on the front side and on the rear side of each clamping body 124, by an amount that is preferably smaller than the thickness d1 of the base body 112. In the alternative, the guide bolts 132 may be two separate guide bolts 132 that are affixed to the front and rear sides of the clamping body 124.

Near the region of the clamping body 124 where clamping surface 126 and sliding surface 128 intersect, each clamping body 124 further includes a plurality of smaller through-bores 131 between its front- and rear-side. The through-bores 131 serve to allow the passage of compressed air that is directed onto the shield in order to facilitate the widening of the shield.

That is, the through-bores (holes) 131 prevent compressed air, which optionally may be blown against the end of the cable to facilitate the widening (spreading) of the braid, from backing up in front of the device, i.e. in front of the clamping bodies, which would have the negative consequence of diminishing the braid-widening effect of the compressed air. In such an embodiment, a compressed air supply apparatus is provided in front of the device to supply the compressed air that facilitates the widening of the braid.

The rear-sides of the guide bolts 132 of each clamping body 124 are respectively inserted into the above-mentioned guide slots 122 such that at least one contact region 126a of the clamping surface 126 of one (first) clamping body 124 is in sliding contact with a contact region 128a of a sliding surface 128 of an adjacent (second) clamping body 124, and at least one contact region 128a of the sliding surface 128 of the one (first) clamping body 124 is in sliding contact with at least one contact region 126a of the clamping surface 126 of the other adjacent (third) clamping body 124. The region of the clamping surface 126 that is not in contact with the sliding surface 128 of the adjacent clamping body 124 is referred to as clamping region 126b. The inverted V-shaped surfaces of the clamping surface 126 fully engage into the V-shaped sliding surface 128, which can be seen in the cross-section view of FIG. 1D. The guide bolts 121 are respectively in sliding contact with the adjacent base surfaces 130 of the clamping bodies 124. In the installed state, the base surface 130 of each clamping body 124 extends parallel to the longitudinal extension of its corresponding guide slot 122.

Due to (i) the abutment of the guide bolts 121 on the respective base surfaces 130, (ii) the simultaneous guiding of the guide bolts 132, which are respectively disposed on the clamping bodies 124, in the corresponding guide slots 122, and (iii) the simultaneous abutment of the clamping surfaces 126 on corresponding sliding surfaces 128, a defined guiding of each clamping body 124 in the direction of the respective guide slot 122 is ensured. Each clamping body 124 is thus shiftable (displaceable) in a direction parallel to its base surface 130.

Because the clamping bodies 124 are disposed substantially on a circle about the central axis A1, it is also achieved that each guide bolt 132 is disposed at the same relative position in the guide slot 122 associated therewith. Furthermore, all clamping bodies 124 can, in essence, be moved or shifted only simultaneously.

The sizes (lengths) of the above-described contact regions 126a, 128a and the clamping regions 126b change depending on the current position of the clamping body 124 (or of its guide bolt 132) in (along) the guide slot 122. That is, an increase of the longitudinal extension (length) of the clamping regions 126b is accompanied by a reduction of the contact regions 126a, 128a between the clamping bodies 124 by the same amount. The maximum size of the clamping regions 126b is achieved by shifting (displacing) each clamping body 124 parallel to its base surface 130 such that the corresponding guide bolts 132 are shifted with respect to the guide slots 122 as far as possible in the clockwise direction relative to the central axis. Due to this increase of the clamping regions 126b, an enlargement of the circumference or diameter (width) of a passage 133 completely surrounded (or defined) by the clamping regions 126b is simultaneously also achieved. Conversely, the circumference or diameter of the passage 133 can be reduced to zero depending on the length of the guide slots 122 by shifting (displacing) the clamping bodies 124 in an opposite (counterclockwise) manner.

In the present embodiment the shape of the passage 133 is an equilateral hexagon, in accordance with the number of (six) clamping bodies 124, and is exclusively defined by the clamping regions 126b. The maximum size of the passage 133 is determined by the maximum size of the clamping regions 128b. In an ideal case, an equilateral hexagon having a side length that is slightly smaller (for example, 1 mm smaller) than the total length 11 of the clamping surface 126 would be possible.

Figure 5:
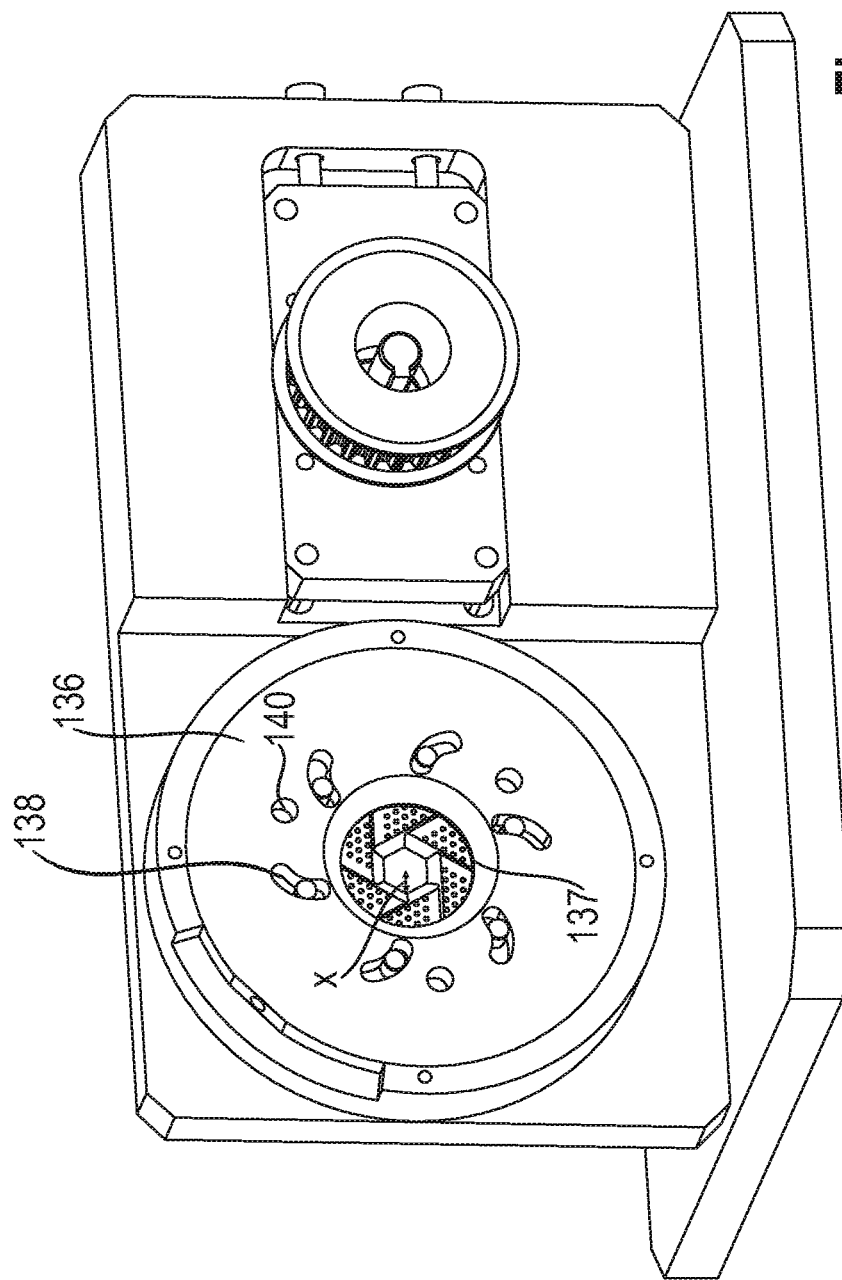
FIG. 5 shows a front view of a further partially assembled cable clamping device according to the first embodiment.

As is shown in FIG. 5, in the next assembly step an adjusting (displacing) device in the form of an adjusting disc 136 is mounted on the guide device 106. The adjusting disc 136 is a disc-shaped body. The outer diameter of the adjusting disc 136 is smaller than D3−(2×b2) and greater than D3−(2×b1) so that the inner side (not visible) of the outer edge of the adjusting disc 136 can slidingly abut on the annular step 117. The thickness of the adjusting disc 136 is slightly smaller than the third thickness d3 of the second edge region 118 so that the adjusting disc 136 does not protrude over the second edge region 118 when it is in the mounted state.

Figure 6:
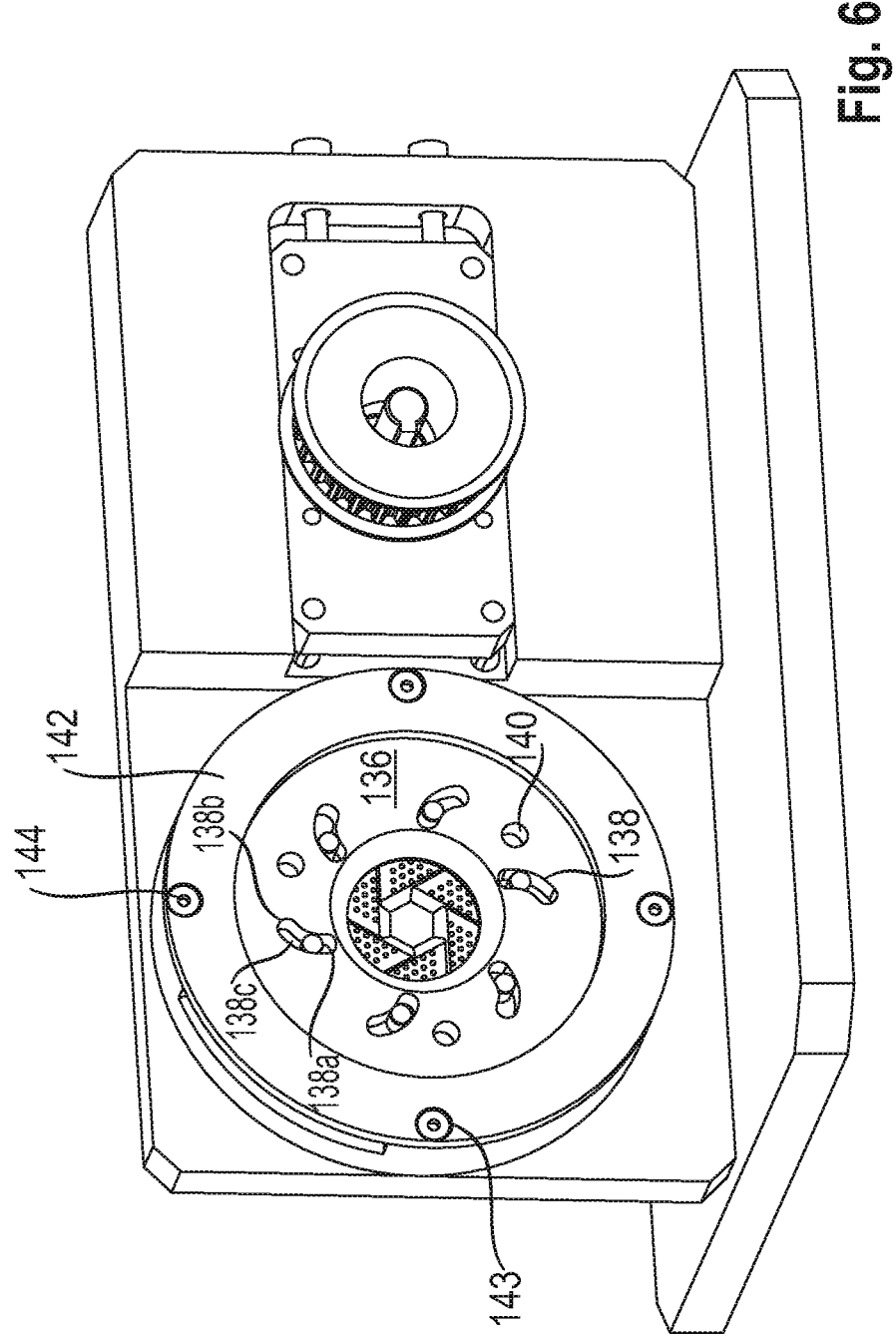
FIG. 6 shows a front view of a further partially assembled cable clamping device according to the first embodiment.

The adjusting disc 136 further includes a central through-hole 137 having a diameter that is preferably equal to the diameter D4, whose central axis in the installed state coincides with the central axis A1. Six curved adjusting slots 138 are provided in the adjusting disc 136. The adjusting slots 138 each have the same scoop-shape (generally bent shape) and are uniformly distributed in the circumferential direction. The curved adjusting slots 138 each include a radially inner end region 138a and a radially outer end region 138b, as shown in FIG. 6. The radially inner end region 138a is disposed radially inward of the radially outer end region 138b. The radially inner end region 138a is connected to the outer end region 138b via the curved central region 138c of the adjusting slot 138. In the present embodiment the curved central region 138c is arc-shaped. In the present embodiment each curved adjusting slot 138 is curved from radially inward towards outward and towards the right (in the clockwise direction), when viewed in a front view.

The curved adjusting slots 138 are configured and disposed such that each guide bolt 132 of each clamping body 124 engages (slides) in one curved adjusting slot 138. Each guide bolt 132 is disposed in the outer end region 138b when it is shifted (displaced) as far as possible in the clockwise direction in the corresponding guide slot 122 relative to the central axis. Conversely, each guide bolt 132 is disposed in the inner end region 138a when it is shifted (displaced) as far as possible in the counterclockwise direction in the corresponding guide slot 122 relative to the central axis. Each guide bolt 132 is disposed in a center of the adjusting slot 138 when it is disposed in the center of a corresponding guide slot 122.

Furthermore, the adjusting disc 136 includes three threaded bores 140 uniformly distributed around the circumferential direction.

In the next assembly step, a retaining ring 142 is mounted on the front side of the second ring region 118 of the guide device 106. The retaining ring 142 has the outer diameter D3 and an inner diameter that is smaller than (D3−b2), so that the inner edge of the retaining ring 142 protrudes inward over the inner edge of the second edge region 118, and is larger than an imaginary circle on which the threaded bores 140 are disposed. Furthermore, four through-bores 143 are uniformly distributed in the circumferential direction. To axially support the adjusting disc 136, the retaining ring 142 is attached to the front side of the second ring region 118 using screw bolts 144 extending through the through-bores 143, which screw bolts 144 are fixed in the threaded bores 119.

As shown in FIGS. 1A to 1D, in a last assembly step a belt pulley 146 is attached to the adjusting disc 136 by screwing three screw bolts 148 into the three threaded bores 140. The belt pulley 146 is thus connected to the adjusting disc 136 so as to rotate therewith.

The cable clamping mechanism 100 may be operated in the following manner.

By rotating the pulley wheel 146, the adjusting disc 136, which is fixedly connected to the pulley wheel 146 and is rotatably supported in the guide device 106, is also rotated. Due to the rotation of the adjusting disc 136, the guide bolts 132 of the clamping body 124 are shifted (displaced), both in the radial direction and in the circumferential direction in a superimposed manner of the two directions, with respect to the central axis A1 (FIG. 4B) along the curved adjusting holes 138 that extend radially and in the circumferential direction. Due to the simultaneous guiding of the guide bolts 132 in the guide slots 122 that are stationary with respect to the base plate 12, the clamping bodies 124 are necessarily shifted (displaced) with respect (or relative) to each other and against/on each other such that the clamping regions 126b become longer or shorter depending on the direction of rotation. The circumference or diameter (width) of the passage 133 also becomes correspondingly larger or smaller. Due to the guiding of the guide bolts 132 in the guide slots 122, it is achieved that the central axis (central axis A1) of the passage 133, which is completely surrounded by the clamping bodies 124 or clamping regions 126b, is not changed (does not move or shift) while the circumference or diameter (width) of the passage 133 is changing.

According to the design of the present embodiment, a reduction of the circumference or diameter (width) of the passage 133 takes place when the belt pulley 146 rotates in the clockwise direction as viewed in the front view. With such a rotation, the guide bolts 132 shift (displace) in the adjusting slots 138 towards the inner end regions 138a, and the guide bolts 132 simultaneously shift (displace) in the guide slots 122 in the clockwise direction.

To rotate the belt pulley 146, a drive motor, for example, an electric motor 22 having a belt-drive wheel 24, is mounted in the drive-device region 16. The motor 22, together with the belt-drive wheel 24, or at least the belt-drive wheel 24 is shiftable (linearly displaceable) using a belt adjusting device 26 such that the distance between the axis of the belt-drive disc wheel 24 and the central axis A1 is adjustable (variable) to adjust the belt tension. In the present embodiment the electric motor 22 is attached to a shiftable plate 30. The shiftable plate 30 is in turn slidably supported in a corresponding recess 32 of the base plate 12 so as to be shiftable (displaceable) towards and away from the central axis A1. The desired distance can be set using adjusting bolts 34.

To transmit rotation of the electric motor 22 to the belt pulley 146, a toothed belt 28 is tensioned on the belt-drive wheel 24 and the belt wheel 146. The belt tension is set using the adjusting bolts 34.

Figure 1D:
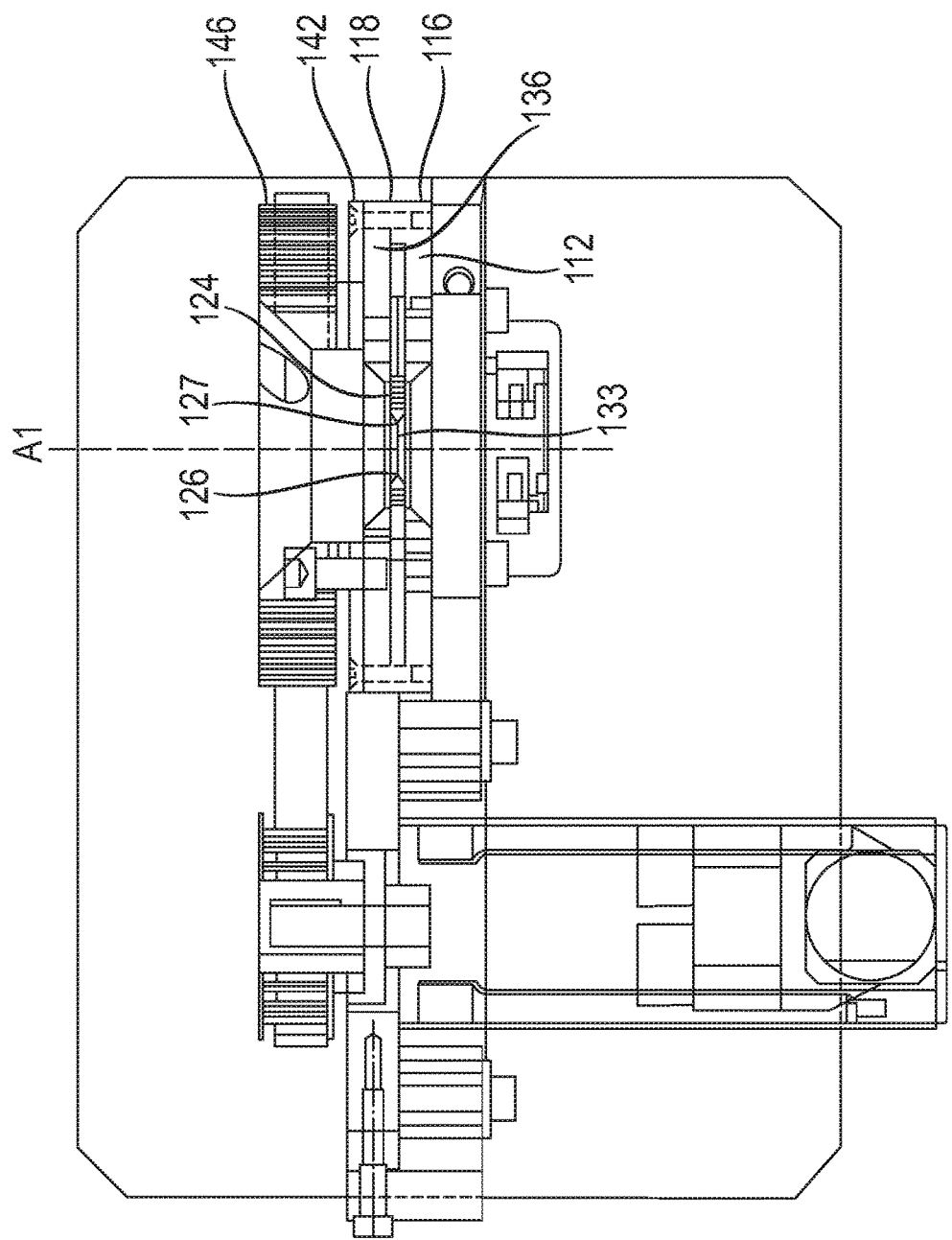
FIG. 1D shows a cross-section view through central axes of a cable-clamping-mechanism region and of a drive-device region of the cable clamping device according to the first embodiment.

The above-described cable retaining device 20, which is provided on the rear side of the passage 133, includes two, e.g. pneumatically actuated, cable retaining jaws 36 (see, for example, FIGS. 1B, 1C, and 1D). These jaws 36 can retain (hold) a cable between them such that the end of the cable extends essentially along the central axis A1 and through the passage 133.

In the operation of the cable clamping device 10 to widen a braided shield, a cable end (not shown), whose outer insulation has already been removed, is guided through the opened passage 133 (after rotation of the adjusting disc 136 in the counterclockwise direction) such that the cable end without outer insulation protrudes by a desired length from the front side of the passage 133. After closing the cable retaining jaws 36 of the cable retaining device 20, the cable end is fixed in this position with respect to the base plate 12.

In the next cable shield processing step, the motor 22 is actuated and the wheel 24 is rotated such that the circumference or diameter (width) of the passage 133 is reduced (in the present embodiment, by rotating the wheel 24 in the clockwise direction). This size reduction can be effected rotating the belt wheel 146 and/or the belt-drive wheel 24 by a predetermined amount that is specified (stored), for example, in a control device 32 shown schematically in FIG. 1B. In the alternative, a predetermined rotation amount can be calculated by the control device 32 from cable-specific data, such as, for example, the diameter of the inner conductor including its insulation. In a further alternative, a resistance-dependent rotation can be achieved by the control device 32 wherein the belt wheel 146 is rotated until a predetermined maximum torque is reached. The maximum torque can also be calculated by a processor in real-time based on cable characteristic values or can be read from a memory based on cable characteristic values.

With the uniform reduction of the diameter or circumference of the passage 133, a radially inwardly directed force is now applied by the edges 127 (see FIG. 1D) of the inverse-V-shaped clamping surfaces 126 onto the braided shield that is resting and exposed on the inner conductor. By applying this radial (squeezing) force, the braided shield is pressed together and/or at least partially pressed-in into the insulation material of the first conductor so that the end part of the braided shield, which end part is protruding towards the front side, is lifted radially outward due to the widening (flaring) of its circumference and is spread (flared) outward. Due to the uniform reduction of the circumference of the passage 133 having six sides, the application of the radial (squeezing) force onto the braided shield is also effected in a particularly uniform manner. Furthermore the mutual engagement of the respective clamping surfaces 126 in the sliding surfaces 128 makes it possible to prevent a pinching of wires of the braided shield between the individual clamping bodies 124.

A cable clamping device (cable shield processing device) according to the second embodiment of the present teachings will now be described with reference to FIGS. 7 to 11. The cable clamping device according to the second embodiment is embodied essentially identical to the cable clamping device of the first embodiment and operates in the same manner. Therefore only the differences to the first embodiment will be described. Identical or similar components are designated by the same or similar reference numbers. A description of identical or similar components is omitted when appropriate to avoid repetition.

Figure 7B:
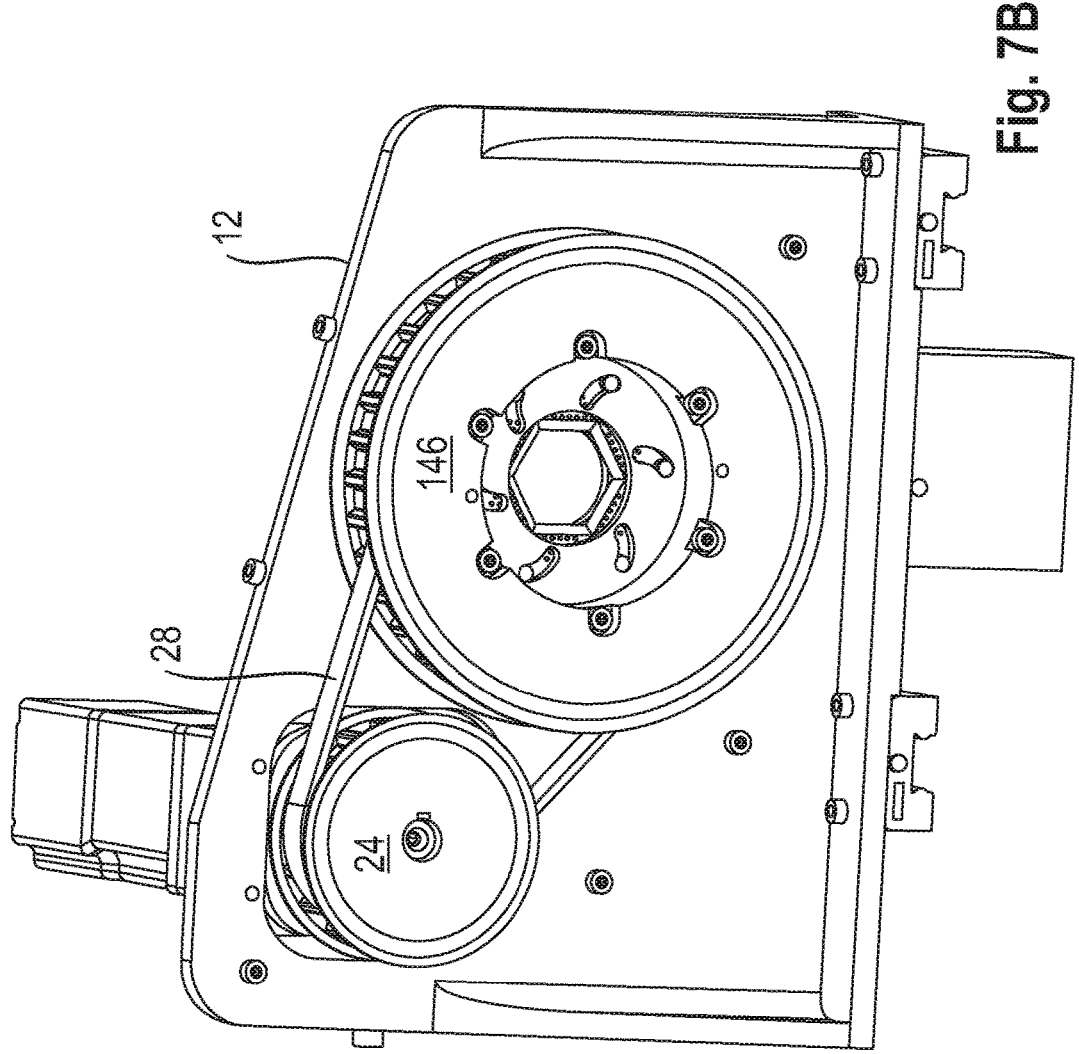
FIG. 7B shows a front view of a partially assembled cable clamping device according to the second embodiment.

FIG. 7A shows the fully assembled cable clamping device according to the second embodiment. As can be seen from FIG. 7A, a cover 38 is attached to the base plate 12. The cover 38 serves to cover the belt-drive wheel 24, the belt wheel 146, and the toothed belt 28, which are shown in FIG. 7B.

The Figures of the second embodiment do not show a cable retaining device, although it can also be provided in the same manner as the cable retaining device 20 of the first embodiment. A suitable mounting bracket (console) 40, which can also serve to attach the cable retaining device, is already available, as shown in FIGS. 7C and 7D.

Figure 8A:
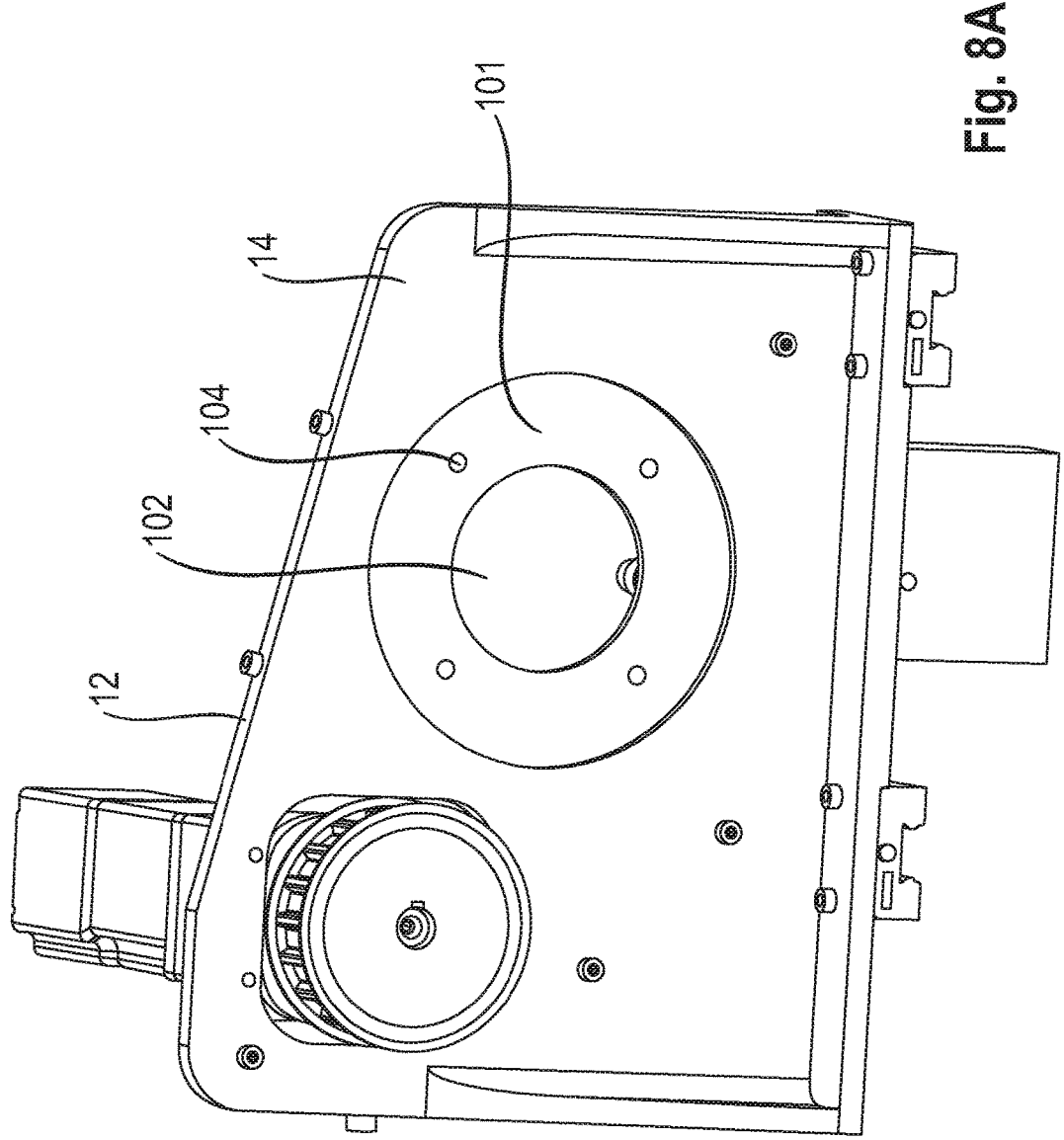
FIG. 8A shows a front view of a further partially assembled cable clamping device according to the second embodiment.
Figure 8B:
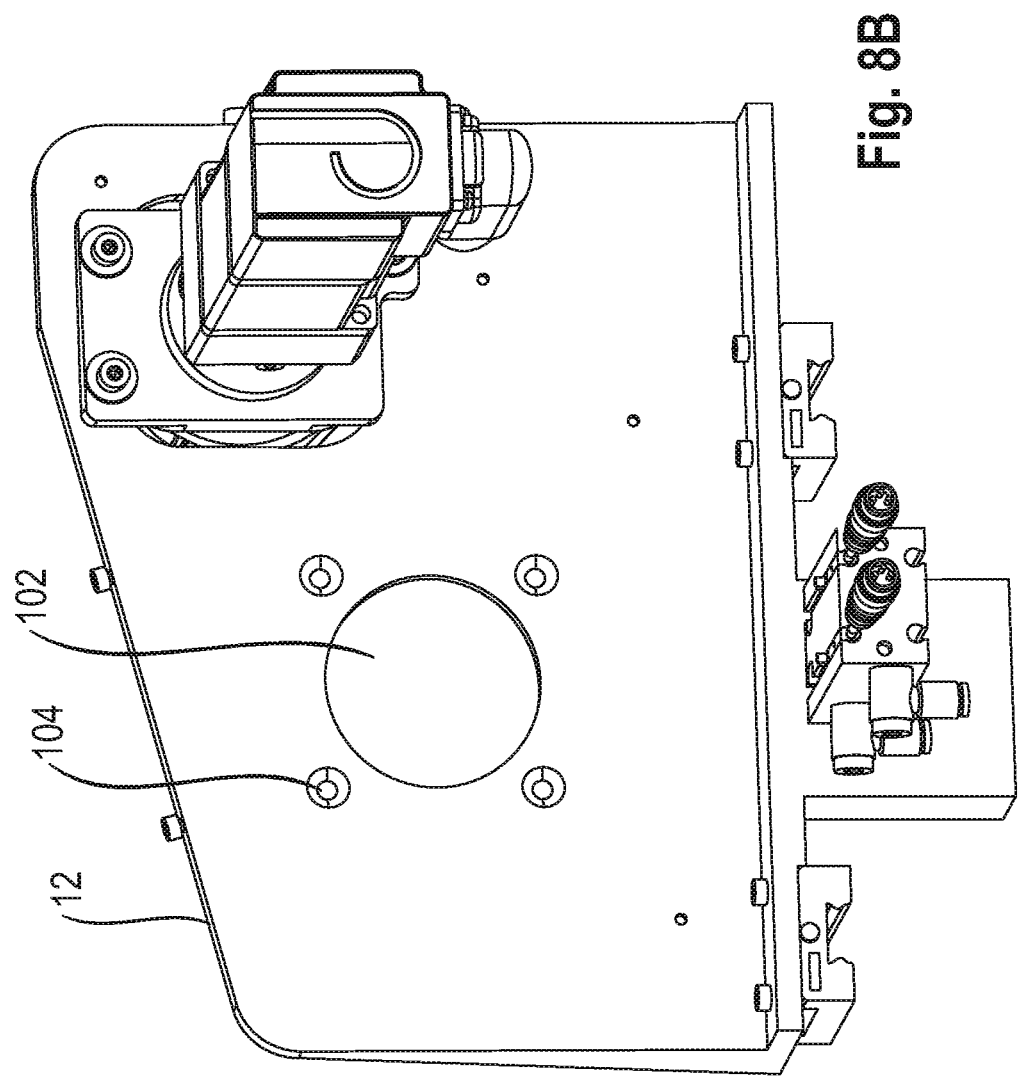
FIG. 8B shows a rear view of FIG. 8A.

As can be seen from FIG. 8A, unlike the first embodiment, the cable-clamping-mechanism region 14 of the base plate 12 includes an annular recessed receiving region 101 on its front side, which is formed in the base plate 12 coaxial to the through-hole 102.

Figure 9A:
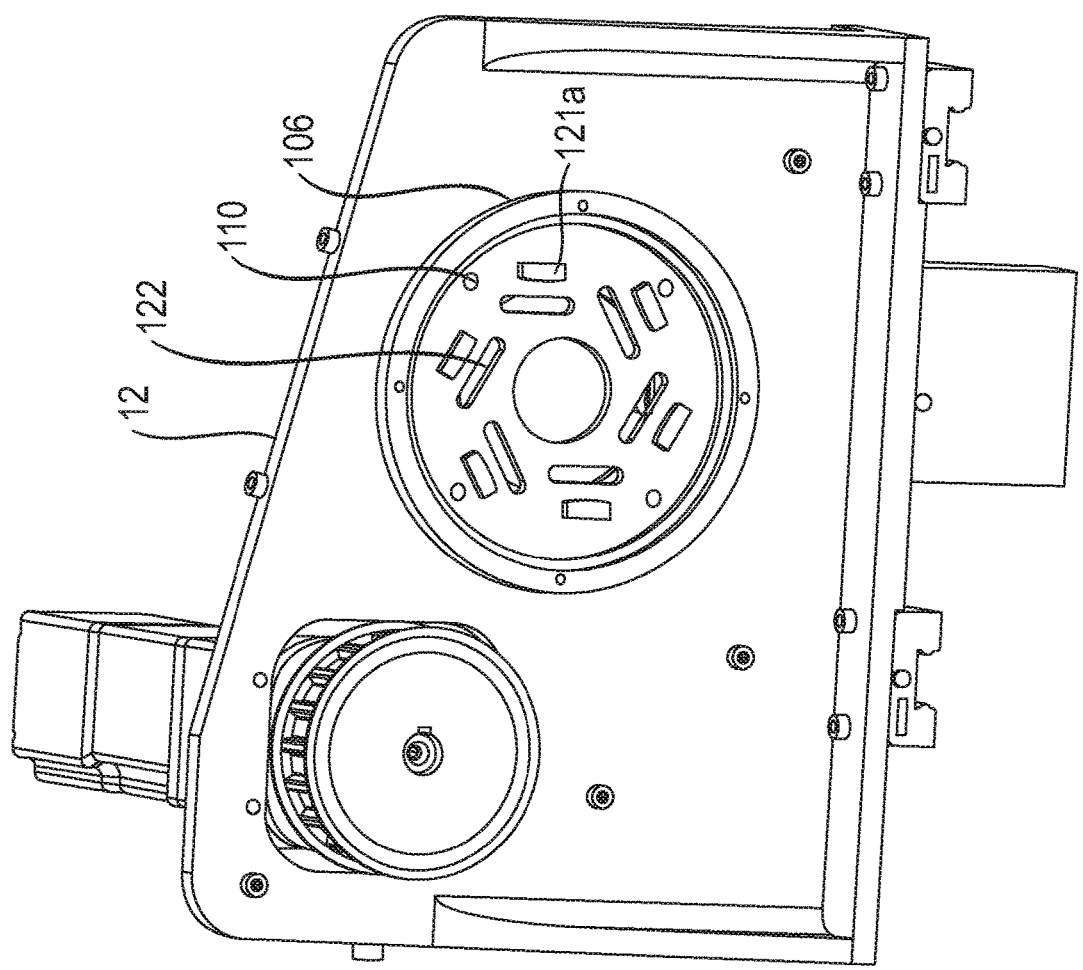
FIG. 9A shows a front view of a further partially assembled cable clamping device according to the second embodiment.
Figure 9D:
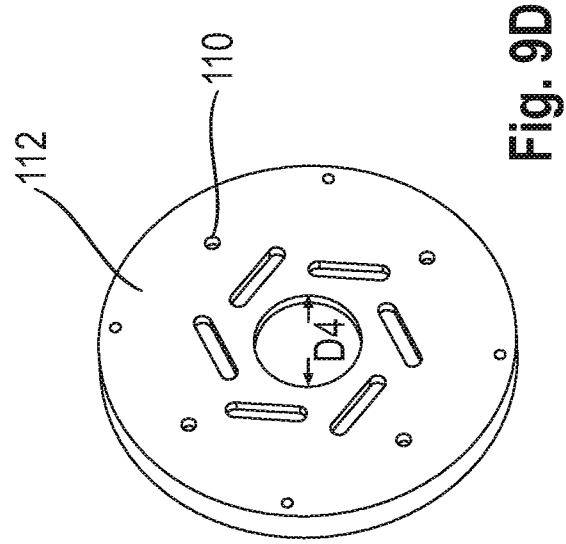
FIG. 9D shows a rear view of FIG. 9C.

As can be seen from FIG. 9A, the receiving region 101 is configured (shaped) such that the rear side of a guide device 106 is inserted into it. FIGS. 9C and 9D show the front- and rear-side of the guide device 106, which also differs slightly from the first embodiment, in the uninstalled state. The guide device 106 is substantially formed from a disc-shaped base body 112 having an outer diameter D3, which is greater than the diameter D1, and a first thickness d1. A central through-hole 113 having a diameter D4, which is smaller than the diameter D1, is provided in the disc-shaped base body 112. In the installed state, a central axis through the through-hole 113 coincides with the central axis A1. Four first threaded bores 110 are uniformly distributed in the circumferential direction along an imaginary circle. In the installed state the threaded bores 110 are aligned with the through-bores 104.

Furthermore, both the disc-shaped base body 112 of the second embodiment and the base body 112 of the first embodiment include six straight guide slots 122 disposed about the central axis A1. Each guide slot 122 has the first predetermined length c and extends in a predetermined direction. Imaginary extensions of adjacent guide slots intersect at an angle β of 120° to each other.

The center points of the guide slots 122 as well as the arrangement of the guide slots 122 with respect to one another and on the base body 112 essentially correspond to the first embodiment.

Unlike in the first embodiment, as can be seen in particular from FIGS. 9A and 9C, instead of the fitting bores 120 that are provided radially outside the guide slots 122, and instead of the guide bolts 121 that are provided therein, guide projections 121a are uniformly distributed in the circumferential direction and are provided radially outside each of the guide slots 122. The guide projections 121a protrude towards the front side of the base body 122 with a height that preferably at least substantially corresponds to the thickness d1 of the clamping body 124. The radially inner sides of the guide projections 121a each include a sliding surface 121b extending parallel to the guide slots 122. The ends 121c of the sliding surfaces 121b are inclined away from the corresponding guide slots 122. The guide projections 121a are configured parallel and centrally with respect to the guide slots 122.

In the alternative to an integral configuration of the guide projections 121a with the base body 112, each guide projection can be configured as a guide spring that is inserted into a corresponding recess or depression in the base body 112.

In the region of the circumferential edge of the base body 112, a step-shaped, annular edge region 114 corresponding to the first embodiment is formed on the front side, shown in FIG. 9C, of the base body 112, with the exception that the second ring region 118*a* of the second embodiment is formed in a continuous manner, i.e., it is not interrupted and there is no gap.

Figure 10B:
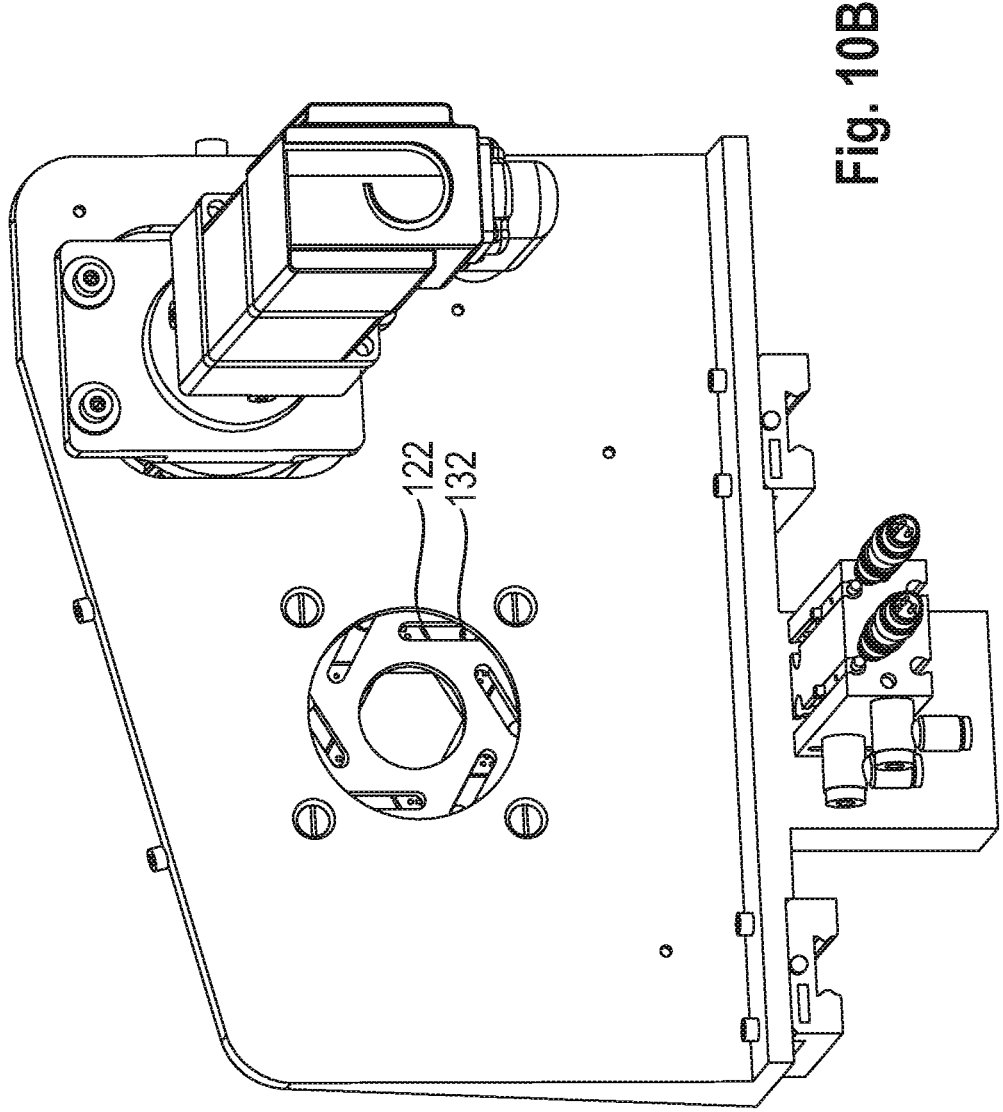
FIG. 10B shows a rear view of FIG. 10A.

The arrangement and design of the clamping bodies 124, shown in FIGS. 10A and 10B, of the second embodiment essentially correspond to that of the first embodiment. Unlike in the first embodiment, the base surfaces 130 of the clamping bodies 124 are guided by the contact with the sliding surfaces 121*b* of the guide projections 121*a*.

Due to (i) the abutment of the sliding surfaces 121*b* on the base surfaces 130, (ii) the simultaneous guiding of the guide bolts 132, which are respectively disposed on the clamping bodies 124, in the corresponding guide slots 122, and (iii) the simultaneous abutment of the clamping surfaces 126 on the corresponding sliding surfaces 128, a defined guiding of each clamping body 124 in the direction of the respective guide slot 122 is ensured. As in the first embodiment, each clamping body 124 is shifted (displaced) essentially in a direction parallel to its base surface 130. The inclined or chamfered ends 121*c* of the sliding surfaces 121*b* serve to prevent twisting in the event of a tilting of the clamping body 126, which may possibly occur during operation.

Figure 11:
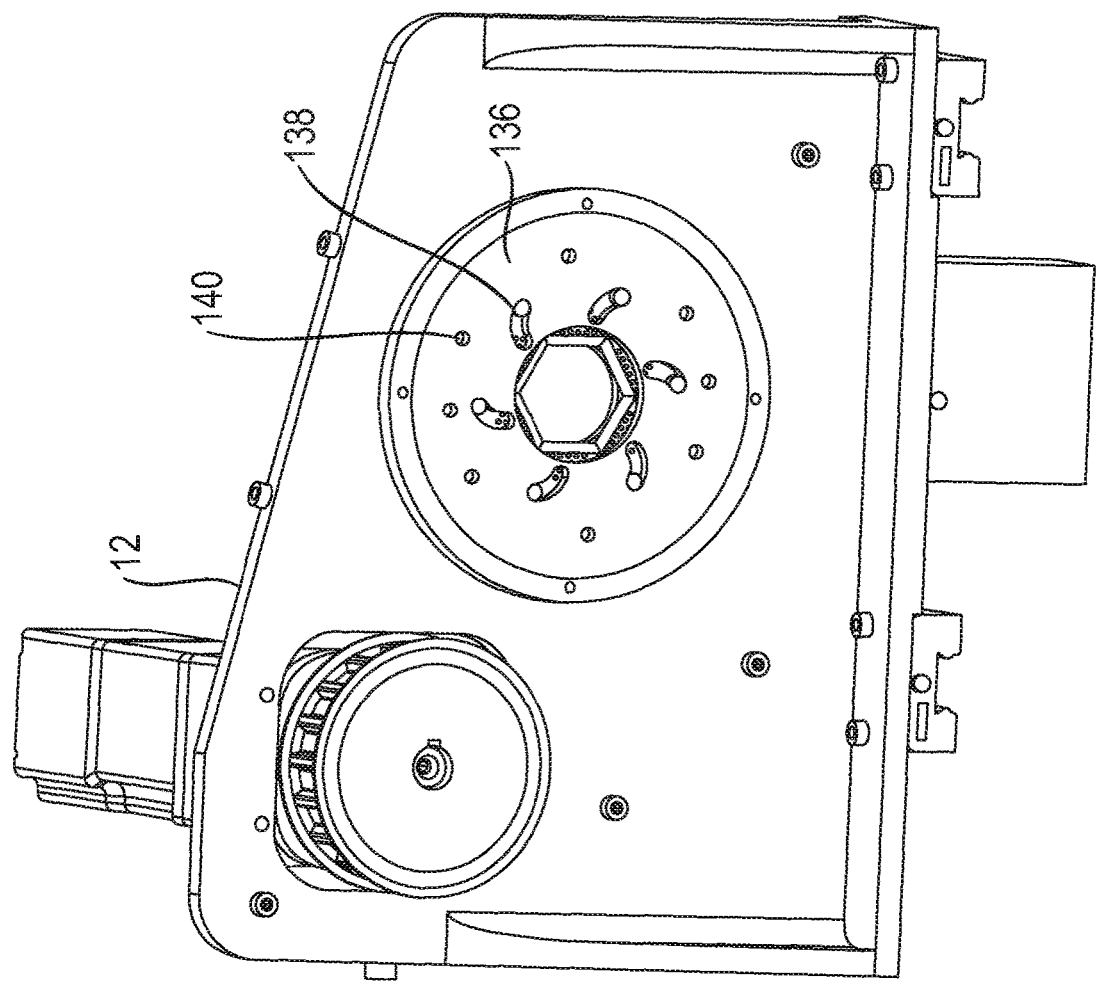
FIG. 11 shows a front view of a further partially assembled cable clamping device according to the second embodiment.

As can be seen from FIGS. 11 and 12, the design and the arrangement of the adjusting disc 136 and of the retaining ring 142 essentially correspond to the first embodiment.

The belt pulley 146, which is attached to the adjusting disc 136 (see FIG. 7B) and is adapted to transmit rotational movement to the adjusting disc 136, also essentially corresponds to the belt pulley 146 of the first embodiment.

In the Figures showing the second embodiment, the passage 133 of the cable clamping device according to the second embodiment is in its most open position. That is, the passage 133 surrounded by the clamping bodies 124 has its maximum circumference and diameter (width), and the guide bolts 132 fixedly connected to the clamping bodies 124 are disposed both in the guide slots 122 in the guide device 106 (base body 112) and in the curved slots 138 of the adjusting disc 136 in the corresponding end regions (end region farthest away from the center point of the passage 133).

Of course, numerous modifications can be made without departing from the subject matter of the present invention. The number of clamping bodies is at least three and this number is essentially unlimited upwards. Each clamping body includes a clamping surface and a sliding surface, which are adjacent to each other in a corner region of the clamping body and extend towards each other at a first predetermined angle α (see FIG. 4A). The first predetermined angle α is calculated from the formula (1): α=360°/N, wherein N is the total number of clamping bodies provided. The shape of the passage 133 is also determined by the number N, such that the passage 133 is shaped as an equilateral polygon having N sides. The order of clamping surfaces and sliding surfaces in the clockwise or counterclockwise direction is arbitrary. With the arrangement of clamping surfaces and sliding surfaces in the stated order in the clockwise direction, the circumference of the passage is reduced by rotating the adjusting disc in the clockwise direction. With a correspondingly reversed arrangement of clamping surfaces and sliding surfaces and the corresponding slots, the circumference of the passage would be reduced by rotating the adjusting disc in the counterclockwise direction.

The clamping bodies are not limited to being formed or shaped as a triangle; in particular they are not limited to equilateral triangles. For example, in the case wherein only three clamping bodies are provided in total, hexagons, for example, may instead be used; in case four clamping bodies are provided in total, rectangles or squares, for example, may be used. In case more than four clamping bodies are used in total, the clamping surfaces and the sliding surfaces always form an acute angle with each other so that the clamping bodies must include at least this acute-angle region. All clamping bodies are preferably equally/identically configured. The guide slots are preferably configured such that they move parallel to a base of an imaginary isosceles triangle.

The arrangement or design of the guide slots 124 in the disc-shaped base body 112 of the guide device 106 necessarily arises from the following constraints:

The longitudinal extension of each guide slot 122 is oriented such that an imaginary line that extends in the direction of the longitudinal extension of the clamping surface 126 of one clamping body 124, and an imaginary line that extends in the direction of the longitudinal extension of the guide slot 122, which is associated with the corresponding (one) clamping body 124, intersect at an angle γ (see FIG. 4B). The angle γ is determined by the following formula (2): γ=(180°−(360°/N))/2. If the clamping body is an isosceles triangle or the clamping surfaces and the sliding surfaces form an imaginary isosceles triangle, the longitudinal extension of the base surface 130 is parallel to that of the guide slot 122.

A first end point of a guide slot is thus preferably determined, for example in that if the guide bolt comes into abutment with this end region, the acute end region of the clamping body, wherein the clamping surface and the sliding surface are adjacent to each other, are disposed as close as possible to the central axis. Preferably the acute end region is substantially disposed in the central axis. The other end point of the guide slot is preferably determined in that the contact region, in which two clamping bodies contact, is as small as possible. In this state the acute end regions are disposed farthest away from the central axis.

The length (c) of each guide slot, in which a maximum change of the diameter (width) of the passage 133 is possible with full utilization of the total length (a) of the clamping surface, is determined from the following formula (3):

$$c = \sqrt[2]{2a^2(1-\cos\alpha)}, \quad (3)$$

wherein the value (a) is the length of the clamping surface.

Furthermore the guide-slot length (c1) (see FIG. 4B) can be determined, for example, from the distance x (see FIG. 4B) of each clamping surface to the center point of the passage using the following formula (4):

$$c1 = \frac{x}{\sin\left(\frac{(180°-\alpha)}{2}\right)}, \quad (4)$$

which is necessary starting from this state (distance x) so that the diameter of the passage 133 can be reduced to zero.

The individual clamping bodies are normally disposed such that the respective points of the clamping bodies, at which point the sliding surface and the clamping surface meet or intersect, move towards each other rectilinearly and in a star-shaped manner to a common point. The common point is normally the center point (central axis A1) of the passage 133.

It is should be understood that the clamping surfaces or sliding surfaces need not be V-shaped. They can, for example, also be configured as a single flat surface or as W-shaped surfaces. The numbers of the above-mentioned through-bores and threaded holes in the base plate, the guide device, and the adjusting device can be arbitrarily varied and are not limited to the numbers described in an exemplary manner.

Depending on the design of the guide slots and the adjusting slots, the guide bolts can be disposed at any positions on the clamping bodies and also at different positions on the front- and rear-side of each clamping body. Each clamping body can also be guided in the guide device using a plurality of guide bolts in a plurality of guide slots.

The adjusting device can also be configured such that not all clamping bodies or even only one clamping body is directly adjusted/shifted using the adjusting device. In this case the other clamping bodies are also shifted by the forced guidance during shifting of the one clamping body. One or more clamping bodies can also be driven by devices that are configured differently from the adjusting disc. In particular, for example, a linear driving can be effected in the guide slots.

The belt drive can be replaced, for example, by a chain drive or direct-gear drive. The motor and the cable clamping mechanism need not be attached to a common base plate.

For further reduction of the axial installation space, the belt pulley could be configured pot-shaped and can circumferentially surround the adjusting device and the guide device.

The order of assembly can be varied as desired.

Parts that slide against one another can be provided with special bearings, such as, for example, ball bearings, in order to facilitate sliding of the components against one another. For example, ball bearings or cylindrical bearings can be disposed in the base body 112, or more precisely in the annular step 117, such that the adjusting disc 136 is supported on the annular step 117 via a plurality of rolling elements (rollers).

The fitting bores can be replaced by threaded bores into which corresponding threaded bolts are inserted. The threaded bores can be replaced by fitting bores, into which corresponding fit bolts are inserted.

The diameter D1 of the circular opening 102 in the base plate 12 is preferably between 10 mm and 200 mm, still more preferably between 20 mm and 100 mm, such as, for example, 50 mm.

The diameter D2 of the imaginary circle, on which the through-bores 104 in the base plate 12 lie, is preferably between 20 mm and 250 mm, still more preferably between 30 mm and 110 mm, such as, for example, 70.7 mm.

The outer diameter D3 of the base body 112 of the guide device 106 is preferably between 50 mm and 300 mm, still more preferably between 90 mm and 200 mm, such as, for example, 96 mm.

The diameter D4 of the central through-hole 113 through the base body 112 of the guide device 106 is preferably between 10 mm and 200 mm, still more preferably between 20 mm and 100 mm, such as, for example, 25 mm.

The diameter D5 of the imaginary circle, on which the threaded bores 110 in the base plate 12 lie, is preferably between 20 mm and 250 mm, still more preferably between 50 mm and 150 mm, such as, for example, 70.7 mm.

The width b1 of the first ring region 116 is preferably between 3 mm and 15 mm, still more preferably between 5 mm and 10 mm, such as, for example, 8 mm.

The width b2 of the second ring region 118, 118a is preferably between 2 mm and 10 mm, still more preferably between 4 mm and 8 mm, such as, for example, 5.5 mm.

The thickness d1 of the base body 112 of the guide device 106 is preferably between 2 mm and 50 mm, still more preferably between 2.5 mm and 20 mm, such as, for example, 3 mm.

The thickness d2 of the first ring region 116 is, depending on the thickness of the clamping body, preferably between 2 mm and 40 mm, still more preferably between 2.5 mm and 20 mm, such as, for example, 3 mm.

The thickness d3 of the second ring region 118, 118a is preferably between 2 mm and 30 mm, still more preferably between 2.5 mm and 20 mm, such as, for example, 3 mm.

The thickness d4 of the clamping body 124 is preferably between 2 mm and 40 mm, still more preferably between 2.5 mm and 20 mm, such as, for example, 3 mm.

The distance a1 between the fitting bores 120 or sliding surfaces 121b and the guide slot 122 is preferably between 3 mm and 100 mm, still more preferably between 4 mm and 30 mm, such as, for example, 6 mm.

The length l1 of the clamping surface 126 and of the sliding surface 128 is preferably between 5 mm and 200 mm, still more preferably between 8 mm and 30 mm, such as, for example, 11 mm.

Metal can preferably be used as material for the cable clamping device.

Additional embodiments disclosed herein include, but are not limited to:

1. A cable clamping device for widening of shields of cables, including:
at least two clamping bodies (124) that are configured to form a passage (133) completely surrounded by them, wherein the clamping bodies (124) are slidable against/on one another to change the size of the circumference of the passage (133).

2. The cable clamping device according to the above-mentioned embodiment 1, wherein:
at least three clamping bodies (124) are provided,
each clamping body (124) includes at least a clamping surface (126) and a sliding surface (128),
the clamping surface (126) and the sliding surface (128) of each of the clamping bodies (124) abut on each other and extend with respect each other at a first predetermined angle α that is smaller than 180°,
the clamping bodies (124) are respectively disposed relative to one another such that the clamping surface (126) of one of the clamping bodies (124) is partially in sliding contact with the sliding surface (128) of an adjacent clamping body (124), and the sliding surface (128) of the one clamping body (124) is partially in sliding contact with the clamping surface (126) of another adjacent clamping body (124),
the passage (133) is formed by at least one clamping region (126b) of each of the clamping surfaces (126), which are not respectively in contact with the sliding surfaces (128) of adjacent clamping bodies (124), the passage (133) being completely surrounded by these clamping regions (126b),
the size of the circumference and/or diameter of the passage (133) is adjustable for clamping a cable to widen a shield by moving the clamping bodies (124) such that each of the clamping surfaces (126) is each shifted with respect to the sliding surface (128) that contacts it.

3. The cable clamping device according to the above-mentioned embodiment 2, wherein:

the size of the circumference of the passage (133) is adjustable by moving the clamping bodies (124) such that the clamping surfaces (126) are each shifted by the same amount and in the same relative direction with respect to the respective contacted sliding surfaces (128).

4. The cable clamping device according to the above-mentioned embodiments 2 or 3, wherein:

the first predetermined angle α equals 360°/N, wherein N is the number of clamping bodies (124).

5. The cable clamping device according to one of the above-mentioned embodiments 2-4, wherein:

based on a coordinate system fixed as a whole with respect to the clamping device, to reduce the size of the circumference and/or diameter of the passage (133) in order to clamp the cable for widening the shield, each clamping body (124) is moved in a direction that is inclined by γ=−(180°−360°/N)/2, wherein N is the number of clamping bodies (124), with respect to a direction that is defined by the longitudinal extension of the clamping surface (126) emanating from the point of intersection of the clamping surface (126) with the sliding surface (128) of an individual clamping body (124), and/or respectively adjacent clamping bodies (124) are moved at an angle β=((N−2)×180°)/N with respect to each other.

6. The cable clamping device according to one of the above-mentioned embodiments 2-5, further including:

a guide device (106) having N first straight guide slots (122), wherein:

each guide slot (122) extends at the angle β to the respectively adjacent guide slot (122), each clamping body (124) includes a guide bolt (132), using which each is slidable in the longitudinal direction of the guide slot (122), with respect to the guide slot (122) or about itself, without rotation of the clamping body (124), in a guide slot (122) associated with the clamping body (124), and the guide slots (122) are configured such that the circumference and/or diameter of the passage (133) is modifiable by simultaneous shifting of all guide bolts (132) in the guide slots (122) without displacing or moving a central axis (A1) extending through the passage (133) with respect to the guide device (106).

7. The cable clamping device according to the above-mentioned embodiment 6, further including:

an adjusting disc (136) having N curved adjusting slots (138), which adjusting disc is rotatable about the central axis (A1) of the through-hole (133), wherein:

each clamping body (124) includes a second guide bolt (132), each of which is shiftable in a curved adjusting slot (138) associated therewith, and rotation of the adjusting disc (136) with respect to the guide device (106) causes the clamping bodies (124) to be shifted along the guide slots (122) of the guide device (106).

8. The cable clamping device according to the above-mentioned embodiment 7, wherein:

the guide device (106) is disposed at least in a first plane perpendicular to the central axis (A1) extending through the through-hole (133), the adjusting disc (136) is disposed at least in a third plane that is parallel to the first plane, and the clamping bodies (124) are disposed in a second plane that is parallel to the first plane and between the first and third plane.

9. The cable clamping device according to one of the above-mentioned embodiments 2-8, wherein:

each of the clamping surfaces (126) is configured in an inverted-V-shaped manner to form a straight edge (127) extending in the longitudinal direction of the clamping surface (126) and each sliding surface (128) forms a V-shaped straight groove such that the thus-formed clamping surfaces (126) and sliding surfaces (128) of adjacent clamping bodies (124), which clamping surfaces (126) and sliding surfaces (128) slide along each other, engage one-into-the-other.

10. The cable clamping device according to one of the above-mentioned embodiments 1-9, wherein:

each clamping body (124) forms an isosceles triangle or at least one region, in which an imaginary isosceles triangle can be placed inside, whose sides form the clamping surface (126) and sliding surface (128), and the direction of movement of each clamping body (124) to reduce the circumference and/or diameter of the passage (133) is parallel to and in the same direction as the direction of extension of the base of the isosceles triangle starting from the point of intersection of the base with the sliding surface (128).

11. The cable clamping device according to any one of the above-mentioned embodiments 1-10, wherein:

each of the clamping surfaces has at least one two-dimensional edge surface that contacts and slides along at least one corresponding two-dimensional edge surface of an adjacent one of the clamping bodies, a plane is defined by said at least one two-dimensional edge surface, an imaginary central axis extends orthogonally through the passage and intersects a center point of the passage, and one of the following conditions (i)-(ii) is met:
(i) an angle formed by said plane intersecting said imaginary central axis is not equal to 90°, or
(ii) said plane is parallel to said imaginary central axis.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved apparatus and methods for widening (flaring or opening) a braided shield of a cable, such as a coaxial cable.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

It is explicitly emphasized that all of the features disclosed in the description and/or the claims should be considered as separate and independent from one another for the purpose of the original disclosure as well as for the purpose of limiting the claimed invention, independent of the combinations of features in the embodiments and/or the claims.

It is explicitly stated that all range specifications or specifications of groups of units disclose every possible intermediate value or subgroup of units for the purpose of the original disclosure as well as for the purpose of limiting the claimed invention, in particular also as the limit of a range specification.

When used with respect to the size of the passage 133, which actually has the shape of an equilateral polygonal (e.g., a hexagon in the preferred embodiment), the term "circumference" is intended to mean a circumscribed circle of the polygon that passes through (intersects) all vertices of the polygon. Similarly, the term "diameter", when used with respect to the size of the equilateral polygonal passage 133, is intended to mean the distance or width between opposite vertices of the polygon.

REFERENCE NUMBER LIST

10 Cable clamping device
12 Base plate
14 Cable-clamping-mechanism region
16 Drive-device region
18 Floor plate
20 Cable retaining device
22 Motor
24 Belt-drive wheel
26 Belt adjusting device
28 Toothed belt
30 Shifting plate
32 Recess
34 Adjusting bolts
36 Cable retaining jaws
38 Cover
40 Mounting bracket
100 Cable clamping mechanism
101 Receiving region
102 Through-hole
104 Through-bores
106 Guide device
108 Screw bolts
110 Threaded bore
112 Disc-shaped base body
113 Through-hole
114 Edge region
116 First ring region
117 Annular step
118, 118a Second ring region
119 Threaded bore
120 Fitting bore
121 Guide bolts
121a Guide projection
121b Sliding surface
121c End
122 Guide slot
124 Clamping body
126 Clamping surface
126a Contact region of the clamping surface
126b Clamping region of the clamping surface
127 Edge
128 Sliding surface
128a Contact region of the sliding surface
130 Base surface
131 Through-bore
132 Guide bolt
133 Passage
134 Through-hole
136 Adjusting disc
137 Through-hole
138 Adjusting slot
138a Inner end region
138b Outer end region
138c Central region
140 Threaded bore
142 Retaining ring
143 Through-bores
144 Screw bolts
146 Belt pulley
148 Screw bolt

We claim:

1. A cable clamping device for widening a braided shield of a cable, comprising:
   at least three clamping bodies arranged to define a passage that is completely surrounded by the clamping bodies, the passage having a periphery in a shape of a polygon, wherein:
   each clamping body includes at least a clamping surface and a sliding surface,
   the clamping bodies are respectively disposed relative to one another such that at least a portion of the clamping surface of one of the clamping bodies is in sliding contact with the sliding surface of an adjacent one of the clamping bodies, and at least a portion of the sliding surface of said one clamping body is in sliding contact with the clamping surface of a different adjacent one of the clamping bodies,
   each of the clamping surfaces has a clamping region that is not in contact with the sliding surface of the adjacent clamping body, a circumference and diameter of the passage being defined by the clamping regions of the clamping surfaces,
   a size of the circumference and/or the diameter of the passage is adjustable to clamp the cable and thereby widen the braided shield of the cable by moving the clamping bodies such that each of the clamping surfaces slides relative the sliding surface that contacts it while continuously remaining in contact therewith,
   each of the clamping surfaces has at least a contact region that is in sliding contact with at least a contact region of the sliding surface of an adjacent one of the clamping bodies,
   at least one common plane is defined by said contact regions,
   an imaginary central axis extends orthogonally through the polygon and intersects a center point of the passage, and
   an angle formed by said common plane intersecting said imaginary central axis is not equal to 90° or 0°.

2. The cable clamping device according to claim 1, wherein the clamping surface and the sliding surface of each said clamping body border each other at a common vertex.

3. The cable clamping device according to claim 1, wherein the clamping surface and the sliding surface of each said clamping body extend towards each other at a first predetermined angle α that is smaller than 180°.

4. The cable clamping device according to claim 1, wherein the clamping regions are disposed such that they contact and press the cable to widen the braided shield of the cable.

5. The cable clamping device according to claim 1, wherein the size of the circumference of the passage is adjustable by moving the clamping bodies such that the clamping surfaces are each shifted by the same amount and in the same relative direction with respect to the respective, contacted sliding surfaces.

6. The cable clamping device according to claim 3, wherein the first predetermined angle α equals 360°/N, wherein N is the number of the clamping bodies.

7. The cable clamping device according to claim 1, wherein:
based on a coordinate system fixed as a whole with respect to the cable clamping device, to reduce the size of the circumference and/or the diameter of the passage in order to clamp the cable and thereby widen the shield, each clamping body is movable in a direction that is inclined by an angle γ=−(180°−360°/N)/2, with respect to a direction that is defined by a longitudinal extension of the clamping surface emanating from the point of intersection of the clamping surface with the sliding surface of an individual clamping body, and/or
respectively adjacent clamping bodies are movable at an angle β=((N−2)×180°)/N with respect to each other, and
wherein N is the number of the clamping bodies.

8. The cable clamping device according to claim 1, further including:
a guide device having N straight guide slots, wherein:
each guide slot extends at an angle β to the respectively adjacent guide slot, the angle β being equal to ((N−2)×180°)/N,
each clamping body includes a first guide bolt,
each clamping body is slidable in a longitudinal direction of the guide slot associated therewith via its guide bolt or by itself, without rotation of the clamping body relative to the guide slot, and
the guide slots are configured such that the circumference and/or the diameter of the passage is adjustable by simultaneously shifting all of the guide bolts in the respective guide slots without displacing or moving a central axis, which orthogonally extends through the passage, with respect to the guide device.

9. The cable clamping device according to claim 8, further including:
an adjusting disc having N curved adjusting slots, wherein:
the adjusting disc is rotatable about the central axis of the passage,
each clamping body includes a second guide bolt on a side of the clamping body opposite of the first guide bolt, the second guide bolt being integrally formed with the first bolt or separate from the first bolt,
the second guide bolts of the clamping bodies respectively engage in, and are shiftable relative to, the N curved adjusting slots, and
rotation of the adjusting disc relative to the guide device causes the clamping bodies to be respectively shifted along the guide slots of the guide device.

10. The cable clamping device according to claim 9, wherein:
the guide device is disposed at least in a first plane perpendicular to the central axis extending through the passage,
the adjusting disc is disposed at least in a third plane that is parallel to the first plane, and
the clamping bodies are disposed in a second plane that is parallel to the first plane and between the first and third plane.

11. A cable clamping device for widening a braided shield of a cable, comprising:
at least three clamping bodies arranged to define a passage that is completely surrounded by the clamping bodies, the passage having a periphery in a shape of a polygon, wherein:
each clamping body includes at least a clamping surface and a sliding surface,
the clamping bodies are respectively disposed relative to one another such that at least a portion of the clamping surface of one of the clamping bodies is in sliding contact with the sliding surface of an adjacent one of the clamping bodies, and at least a portion of the sliding surface of said one clamping body is in sliding contact with the clamping surface of a different adjacent one of the clamping bodies,
each of the clamping surfaces has a clamping region that is not in contact with the sliding surface of the adjacent clamping body, a circumference and diameter of the passage being defined by the clamping regions of the clamping surfaces,
a size of the circumference and/or the diameter of the passage is adjustable to clamp the cable and thereby widen the braided shield of the cable by moving the clamping bodies such that each of the clamping surfaces slides relative the sliding surface that contacts it while continuously remaining in contact therewith, each of the clamping surfaces has at least a contact region that is in sliding contact with at least a contact region of the sliding surface of an adjacent one of the clamping bodies, at least one common plane is defined by said contact regions, an imaginary central axis extends orthogonally through the polygon and intersects a center point of the passage, and an angle formed by said common plane intersecting said imaginary central axis is not equal to 90° or 0°, wherein:
each of the clamping surfaces has a V-shaped ridge with a straight edge extending along a longitudinal direction of the clamping surface, and
each sliding surface has a V-shaped straight groove that slidably receives and engages the V-shaped ridge of the clamping surface associated therewith.

12. The cable clamping device according to claim 1, wherein:
each clamping body has an isosceles triangle shape or has at least one region, in which an imaginary isosceles triangle can be placed inside, equal length sides of the isosceles triangle forming the clamping surface and the sliding surface of the clamping body, and
the direction of movement of each clamping body to reduce the circumference and/or the diameter of the passage is parallel to and in the same direction as the direction of extension of a base of the isosceles triangle starting from a point of intersection of the base with the sliding surface.

13. The cable clamping device according to claim 10, wherein:
the at least three clamping bodies comprise six clamping bodies,
each of the six clamping bodies is shaped as an equilateral triangle, and
the size of the circumference of the passage is adjustable by moving the six clamping bodies such that the clamping surfaces are each shifted by the same amount and in the same relative direction with respect to the respective, contacted sliding surfaces.

14. The cable clamping device according to claim 1, wherein:

the at least three clamping bodies comprise an even number of total clamping bodies, and diametrically-opposite pairs of the clamping bodies are configured to move both radially and circumferentially in a point symmetric manner with respect to a center point of the passage during movement of the clamping body that changes the size of the circumference of the passage.

15. The cable clamping device according to claim 1, including a support member having a through opening, wherein the at least three clamping bodies are supported on the support member.

16. The device according to claim 11, including a support member having a through opening, wherein the at least three clamping bodies are supported on the support member.

* * * * *